(12) United States Patent
Shinoto et al.

(10) Patent No.: US 11,988,987 B2
(45) Date of Patent: May 21, 2024

(54) HOUSING STRUCTURE AND PROCESSING DEVICE EQUIPPED WITH HOUSING STRUCTURE

(71) Applicant: FUJIFILM Business Innovation Corp., Tokyo (JP)

(72) Inventors: Keigo Shinoto, Kanagawa (JP); Kota Sato, Kanagawa (JP); Taisuke Endo, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 401 days.

(21) Appl. No.: 17/543,694

(22) Filed: Dec. 6, 2021

(65) Prior Publication Data

US 2023/0053735 A1 Feb. 23, 2023

(30) Foreign Application Priority Data

Aug. 23, 2021 (JP) .................................. 2021-135475

(51) Int. Cl.
*G03G 15/00* (2006.01)
*F16B 5/00* (2006.01)
*G03G 21/16* (2006.01)

(52) U.S. Cl.
CPC ....... *G03G 21/1604* (2013.01); *F16B 5/0024* (2013.01); *G03G 15/6502* (2013.01);
(Continued)

(58) Field of Classification Search
CPC ........... G03G 15/6502; G03G 21/1604; G03G 21/1619; H04N 1/00538; F16B 5/0024;
(Continued)

(56) References Cited

U.S. PATENT DOCUMENTS

| 2020/0301349 A1* | 9/2020 | Ishikawa | G03G 21/1619 |
|---|---|---|---|
| 2021/0063943 A1* | 3/2021 | Tomono | G03G 21/1619 |
| 2021/0063944 A1* | 3/2021 | Nakamura | G03G 21/1619 |

FOREIGN PATENT DOCUMENTS

| JP | S60173955 | 11/1985 |
|---|---|---|
| JP | 2005134590 | 5/2005 |

\* cited by examiner

*Primary Examiner* — Hoang X Ngo
(74) *Attorney, Agent, or Firm* — JCIPRNET

(57) ABSTRACT

A housing structure includes an upper housing at an upper side of a device housing, a lower housing at a lower side of the device housing, and a positioner that positions the upper housing on the lower housing. One side surface of the device housing has an opening extending astride the lower housing and the upper housing when the upper housing is positioned on the lower housing. The positioner includes a reference positioning element that is provided toward any one of four corners of a connection area between the lower housing and the upper housing and that has a reference hole provided in one of or each of the lower housing and the upper housing and a positioning reference pin fitted in the reference hole, an anti-rotation element that is provided toward another corner of the four corners excluding the corner near where the reference positioning element is provided and that has an anti-rotation pin provided at one of the lower housing and the upper housing and an anti-rotation hole that is provided in the other one of the lower housing and the upper housing, receives the anti-rotation pin, and suppresses rotation of the upper housing relative to the lower housing about the reference positioning element, and position regulation elements that are respectively provided toward corners, of the four corners, located at opposite sides of the opening such that the one side surface having the opening is interposed between the corners. The position regulation elements individually have position regulation pins provided at one of the (Continued)

lower housing and the upper housing and position regulation holes that are provided in the other one of the lower housing and the upper housing, receive the position regulation pins, and positionally regulate the corners located at the opposite sides of the opening.

20 Claims, 16 Drawing Sheets

(52) U.S. Cl.
CPC ...... *B65H 2402/10* (2013.01); *B65H 2402/30* (2013.01); *B65H 2402/443* (2013.01); *G03G 21/1619* (2013.01)

(58) Field of Classification Search
CPC ............ B65H 2402/10; B65H 2402/30; B65H 2402/443
USPC ................................................. 399/107, 110
See application file for complete search history.

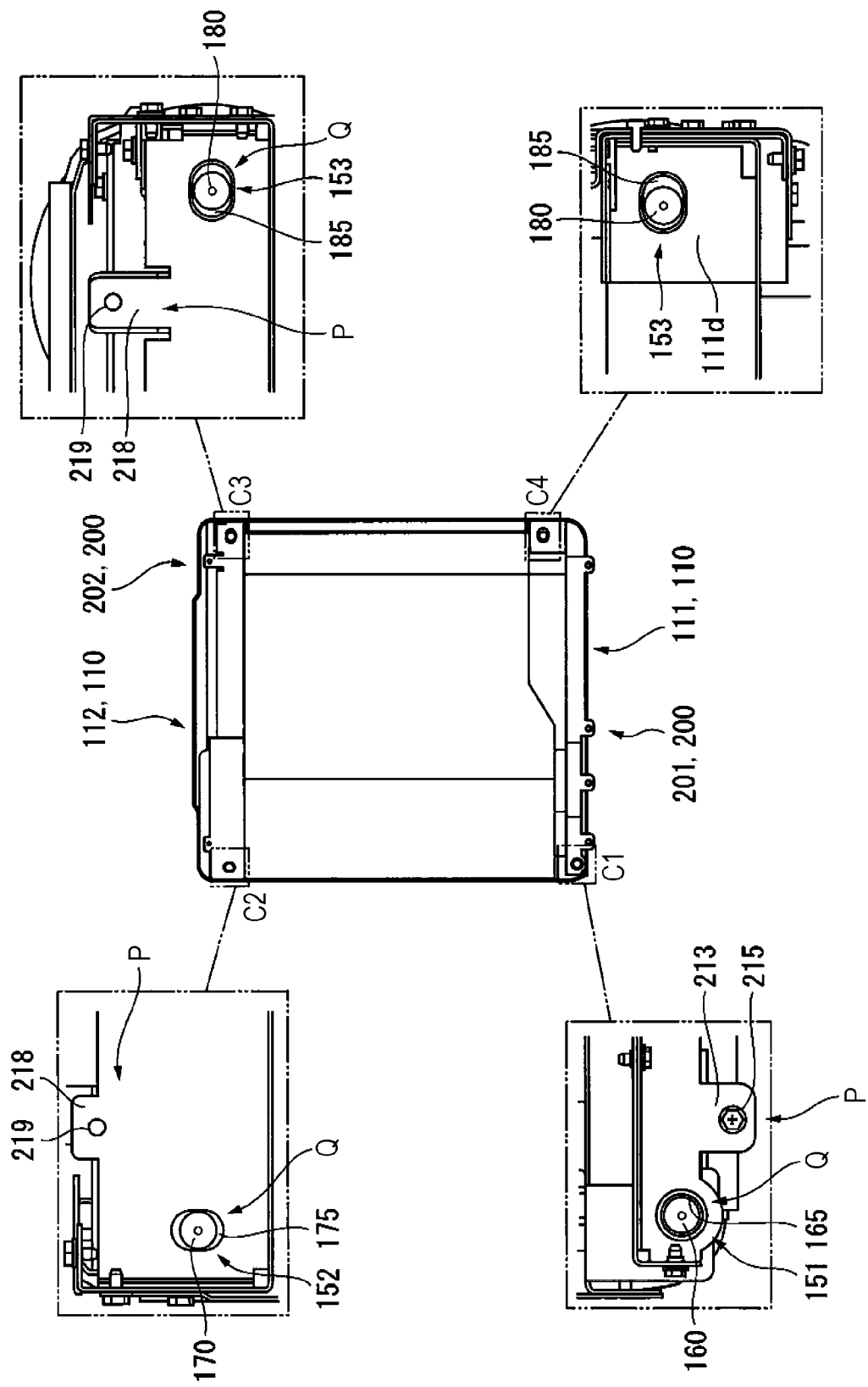

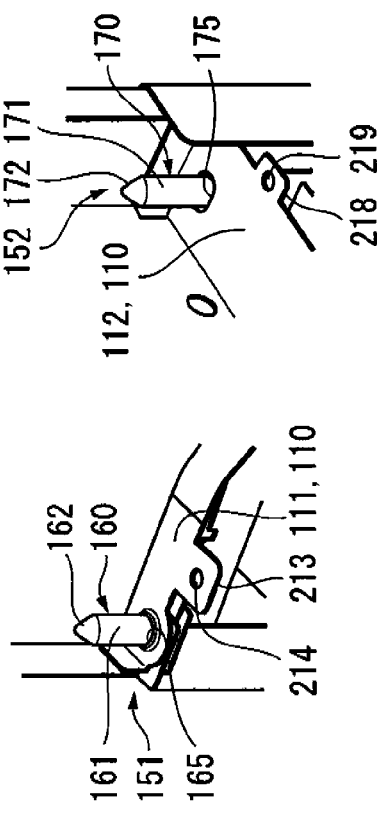
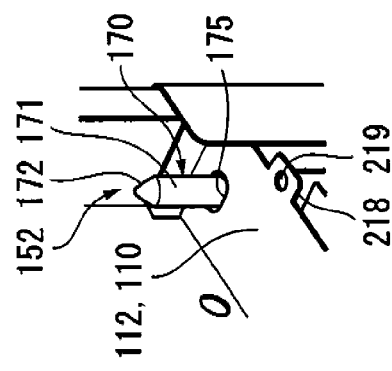
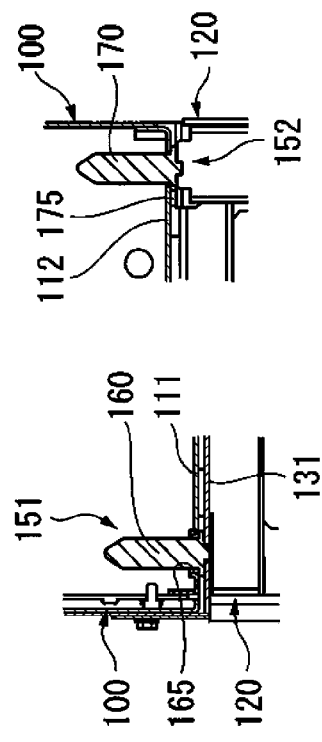
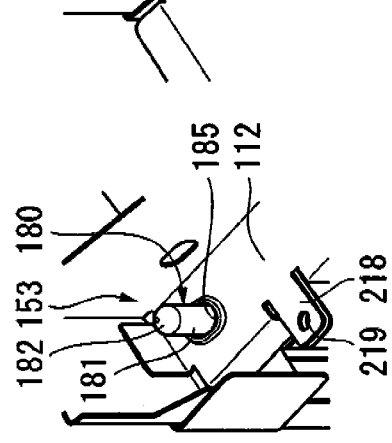
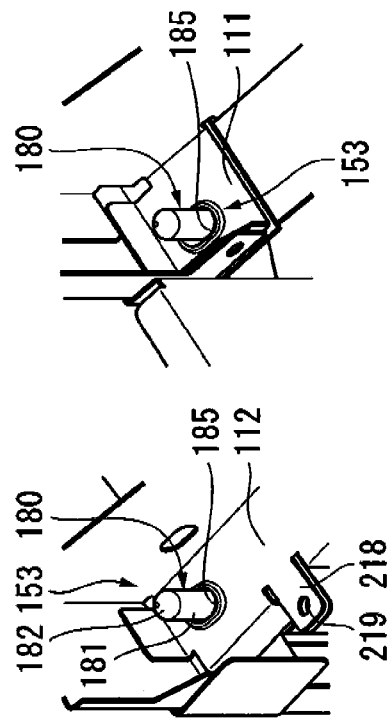
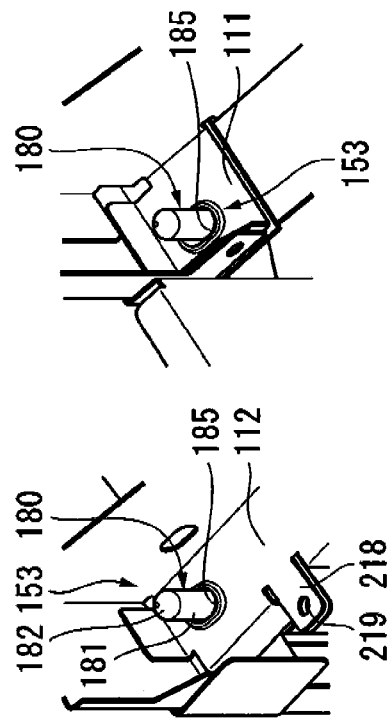
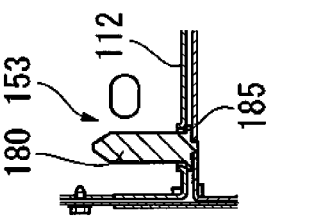
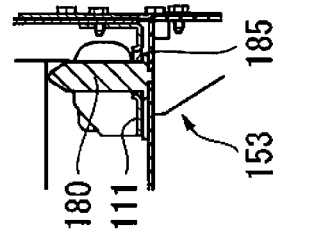

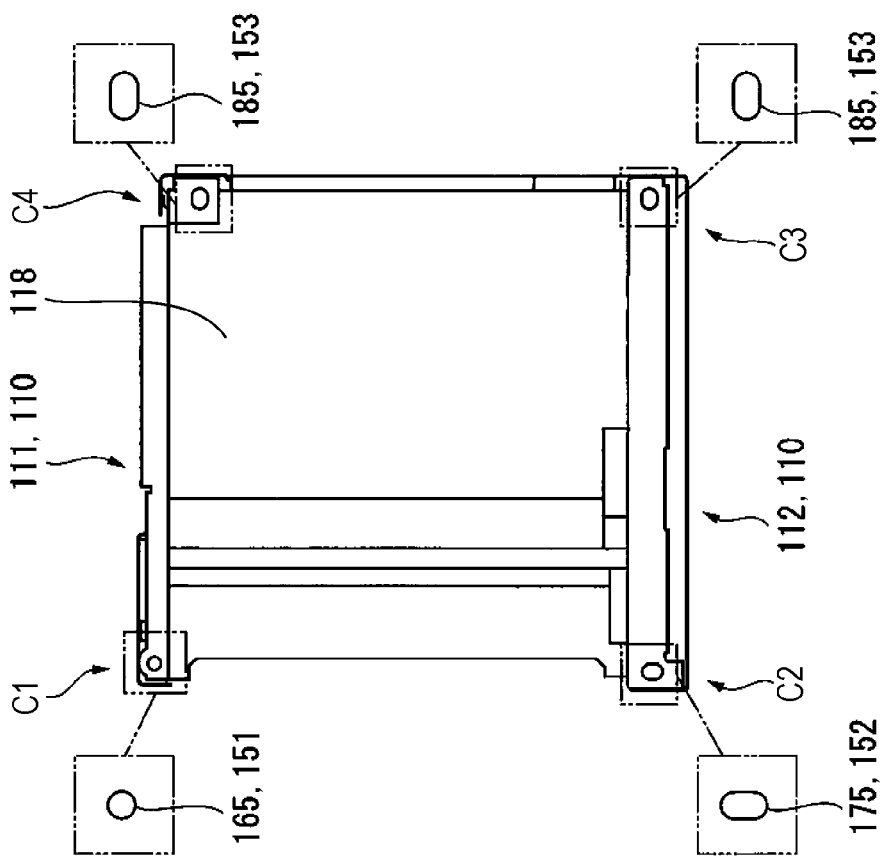
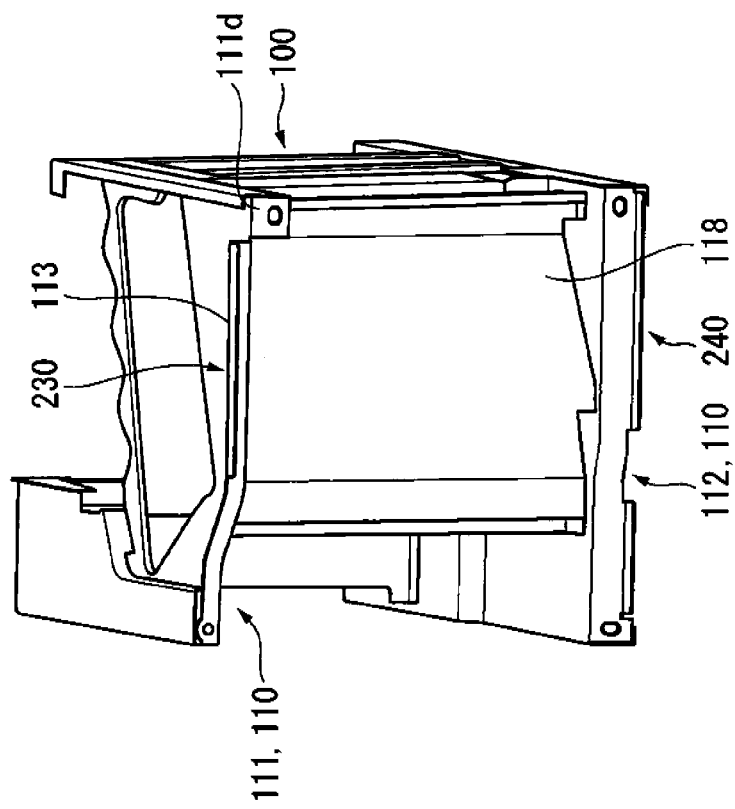
FIG. 11A
FIG. 11B

HOUSING STRUCTURE AND PROCESSING DEVICE EQUIPPED WITH HOUSING STRUCTURE

CROSS-REFERENCE TO RELATED APPLICATIONS

This application is based on and claims priority under 35 USC 119 from Japanese Patent Application No. 2021-135475 filed Aug. 23, 2021.

BACKGROUND

(i) Technical Field

The present disclosure relates to housing structures split into upper and lower components, and to processing devices equipped with the housing structures.

(ii) Related Art

In general, a known processing device, such as an image forming device, is equipped with a housing structure split into upper and lower components.

Japanese Unexamined Utility Model Registration Application Publication No. 60-173955 (Embodiment, FIG. 1) and Japanese Unexamined Patent Application Publication No. 2005-134590 (Embodiment, FIG. 1) disclose known examples of housing structures of this type.

Japanese Unexamined Utility Model Registration Application Publication No. 60-173955 discloses an upper-and-lower-frame-plate setting structure of a slotted photocopier in which an upper frame is pivotally connected to an end of a lower frame. In this upper-and-lower-frame-plate setting structure, a recess is provided at an end of one of the upper and lower frames opposite the pivotally-connected section between the upper and lower frames, and a pin to be fitted into the recess is provided at an end of the other frame.

Japanese Unexamined Patent Application Publication No. 2005-134590 discloses an office device. In this office device, a lower housing is provided with an L-shaped joining member protruding upward from a top plate of a lower housing frame. An upper housing has a bottom plate provided with a bottom-plate through-hole through which the L-shaped joining member is extendable. A side plate of an upper housing frame is provided with a through-window facing the L-shaped joining member extending through the bottom-plate through-hole. The upper housing is also provided with a detachable rectangular gripping member that extends through the through-window and locks the L-shaped joining member in the state where the L-shaped joining member extends through the bottom-plate through-hole, so as to prevent the L-shaped joining member from falling out of the bottom-plate through-hole.

SUMMARY

Aspects of non-limiting embodiments of the present disclosure relate to a device housing that is split into a lower housing and a upper housing and whose one side surface has an opening extending astride both the lower housing and the upper housing, the device housing having ensured rigidity while allowing the upper housing to be accurately positioned on the lower housing.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a housing structure including: an upper housing at an upper side of a device housing; a lower housing at a lower side of the device housing; and a positioner that positions the upper housing on the lower housing, wherein one side surface of the device housing has an opening extending astride the lower housing and the upper housing when the upper housing is positioned on the lower housing, wherein the positioner includes: a reference positioning element that is provided toward any one of four corners of a connection area between the lower housing and the upper housing and that has a reference hole provided in one of or each of the lower housing and the upper housing and a positioning reference pin fitted in the reference hole; an anti-rotation element that is provided toward another corner of the four corners excluding the corner near where the reference positioning element is provided and that has an anti-rotation pin provided at one of the lower housing and the upper housing and an anti-rotation hole that is provided in the other one of the lower housing and the upper housing, receives the anti-rotation pin, and suppresses rotation of the upper housing relative to the lower housing about the reference positioning element; and position regulation elements that are respectively provided toward corners, of the four corners, located at opposite sides of the opening such that the one side surface having the opening is interposed between the corners, the position regulation elements individually having position regulation pins provided at one of the lower housing and the upper housing and position regulation holes that are provided in the other one of the lower housing and the upper housing, receive the position regulation pins, and positionally regulate the corners located at the opposite sides of the opening.

BRIEF DESCRIPTION OF THE DRAWINGS

Exemplary embodiments of the present disclosure will be described in detail based on the following figures, wherein:

FIG. 6 schematically illustrates a positioned state by the positioning mechanism when the upper housing is positioned on the lower housing in the housing structure according to the first exemplary embodiment;

FIGS. 7A to 7H illustrate detailed configurations at first to fourth corners of a device housing in the positioned state by the positioning mechanism in FIG. 6, FIG. 7A being a perspective view of a reference positioning element at the first corner, FIG. 7B being a cross-sectional view of the reference positioning element, FIG. 7C being a perspective view of an anti-rotation element at the second corner, FIG. 7D being a cross-sectional view of the anti-rotation element, FIG. 7E being a perspective view of a position regulation element at the third corner, FIG. 7F being a cross-sectional view of the position regulation element, FIG. 7G being a perspective view of a position regulation element at the fourth corner, FIG. 7H being a cross-sectional view of the position regulation element;

FIG. 11A illustrates the upper housing split from the lower housing in FIG. 10, as viewed at an angle from below, and FIG. 11B is a bottom view of the upper housing;

DETAILED DESCRIPTION

Overview of Exemplary Embodiment

Figure 1A:
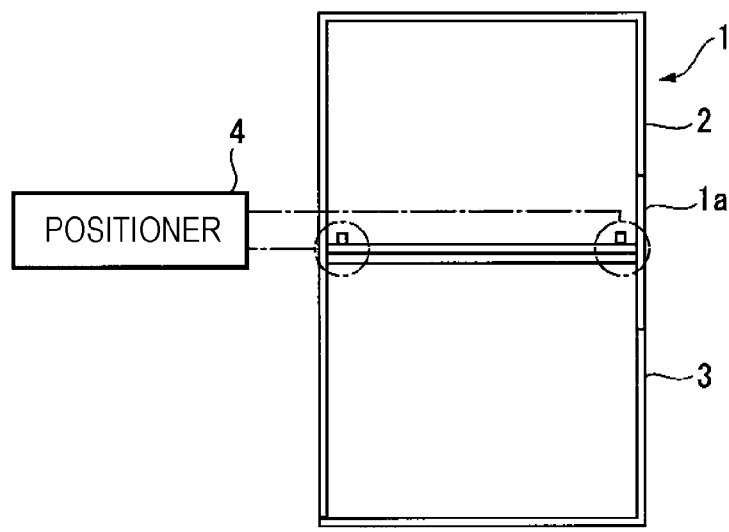
FIG. 1A schematically illustrates a processing device equipped with a housing structure according to an exemplary embodiment of the present disclosure, FIG. 1B schematically illustrates a state where the housing structure shown in FIG. 1A is split into an upper housing and a lower housing, and FIG. 1C schematically illustrates a state where the upper housing is positioned on the lower housing.

FIG. 1A schematically illustrates a processing device equipped with a housing structure according to an exemplary embodiment of the present disclosure.

In FIG. 1A, the processing device is equipped with a housing structure including an upper housing 2 at the upper side of a device housing 1, a lower housing 3 at the lower side of the device housing 1, and a positioner 4 that positions the upper housing 2 on the lower housing 3. When the upper housing 2 is positioned on the lower housing 3, one side surface of the device housing 1 has an opening 1a extending astride the lower housing 3 and the upper housing 2, an upper processing unit (not shown) is installed in the upper housing 2, and a lower processing unit (not shown) is installed in the lower housing 3.

In this example, the processing device widely includes a device that performs predetermined processing on a processing target. Examples of the processing device include an image forming device that forms an image onto a medium serving as the processing target, a coating device that applies a coating to the medium, and other various types of processing devices for the medium (such as a cutting device, a folding device, and a hole-punching device).

The device housing 1 is split into the upper housing 2 and the lower housing 3 serving as upper and lower components, respectively. In order to combine the lower housing 3 and the upper housing 2, the upper housing 2 is to be positioned on the lower housing 3.

In particular, in this example, because one side surface of the device housing 1 has the opening 1a extending astride the lower housing 3 and the upper housing 2, the lower housing 3 and the upper housing 2 are reduced in rigidity at the side with the opening 1a of the device housing 1, thus making it difficult to position the upper housing 2 on the lower housing 3.

Although there are various technical backgrounds with regard to the necessity of providing such an opening 1a, for example, if the lower processing unit is disposed at an angle to ensure an installation space for various types of control substrates between the lower processing unit and the upper processing unit, it is desirable that the opening 1a extending astride the upper housing 2 and the lower housing 3 be ensured as a workspace for installing the various types of control substrates, thus causing limitations where it becomes difficult to set a frame member, such as a tie rod, across the boundary between the upper housing 2 and the lower housing 3.

Figure 1B:
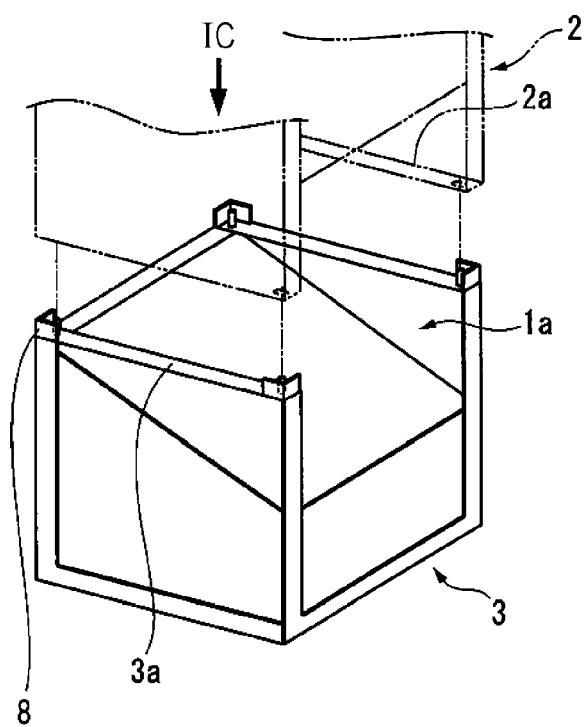
Figure 1C:
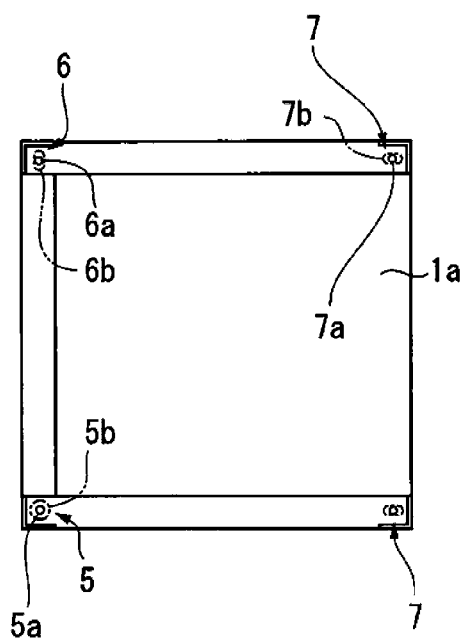

In this exemplary embodiment, as shown in FIGS. 1B and 1C, the positioner 4 includes a reference positioning element 5 provided toward any one of four corners of a connection area between the lower housing 3 and the upper housing 2, an anti-rotation element 6 provided toward another corner of the four corners excluding the corner near where the reference positioning element 5 is provided, and position regulation elements 7 respectively provided toward corners, of the four corners, located at opposite sides of the opening 1a such that the one side surface having the opening 1a is interposed between the corners. The reference positioning element 5 has a reference hole 5b provided in one of or each of the lower housing 3 and the upper housing 2 and a positioning reference pin 5a fittable in the reference hole 5b. The anti-rotation element 6 has an anti-rotation pin 6a provided at one of the lower housing 3 and the upper housing 2 and an anti-rotation hole 6b that is provided in the other housing, receives the anti-rotation pin 6a, and suppresses rotation of the upper housing 2 relative to the lower housing 3 about the reference positioning element 5. The position regulation elements 7 individually have position regulation pins 7a provided at one of the lower housing 3 and the upper housing 2 and position regulation holes 7b that are provided in the other housing, receive the position regulation pins 7a, and positionally regulate the corners located at the opposite sides of the opening 1a.

From another standpoint, as shown in FIGS. 1B and 1C, the positioner 4 includes a reference positioning element 5 provided toward any one of four corners of a connection area between the lower housing 3 and the upper housing 2, an anti-rotation element 6 provided toward another corner of the four corners excluding the corner near where the reference positioning element 5 is provided, and position regulation elements 7 respectively provided toward corners, of the four corners, located at opposite sides of the opening 1a such that the one side surface having the opening 1a is interposed between the corners. The reference positioning element 5 has a reference hole 5b provided in one of or each of the lower housing 3 and the upper housing 2 and a positioning reference pin 5a fittable in the reference hole 5b. The anti-rotation element 6 has an anti-rotation pin 6a provided at one of the lower housing 3 and the upper housing 2 and an anti-rotation hole 6b that is provided in the other housing, receives the anti-rotation pin 6a, and has a shape of a long hole extending in a direction connecting the center of the reference positioning element 5 and the center of the anti-rotation pin 6a. The position regulation elements 7 individually have position regulation pins 7a provided at one of the lower housing 3 and the upper housing 2 and position regulation holes 7b that are provided in the other housing and receive the position regulation pins 7a. At least one of the position regulation holes 7b has a shape of a long hole extending orthogonally to a direction connecting the centers of the position regulation pins 7a.

In such a technology, each of the elements (i.e., the reference positioning element 5, the anti-rotation element 6, and the position regulation elements 7) of the positioner 4 is provided toward any one of the four corners of the connection area between the lower housing 3 and the upper housing 2. The expression "toward a corner" refers to a state where the element is offset toward the corner when the center position between neighboring corners and the position of the corner are compared with each other. Thus, each element may be provided at the corner or may be provided near the corner. It is desirable that the elements be arranged in this manner for positioning the four corners of the connection area between the lower housing 3 and the upper housing 2, as compared with a case where each element is provided toward the center position between neighboring corners.

Furthermore, although the positional relationship between the pin and the hole of each of the elements (i.e., the reference positioning element 5, the anti-rotation element 6, and the position regulation elements 7) relative to the upper housing 2 and the lower housing 3 is arbitrary, it is desirable that the lower housing 3 be provided with the pins to facilitate the positioning process when the upper housing 2 is placed on the lower housing 3. Although the reference positioning element 5 is normally provided with the positioning reference pin 5a at either one of the lower housing 3 and the upper housing 2 and the reference hole 5b in the other housing, both of the lower housing 3 and the upper housing 2 may be provided with reference holes 5b, and positioning reference pins 5a may be fitted in the two reference holes 5b.

Next, representative examples of the housing structure according to this exemplary embodiment will be described.

First, the positioner 4 is desirably configured such that the reference positioning element 5, the anti-rotation element 6, and the position regulation elements 7 be entirely or partially provided at the four corners of the connection area between the lower housing 3 and the upper housing 2. This example involves directly positioning the corners and is effective in terms of positioning the four corners of the connection area between the lower housing 3 and the upper housing 2, as compared with a case where areas located away from the corners are positioned.

Furthermore, the positioner 4 is desirably configured such that the reference positioning element 5, the anti-rotation element 6, and the position regulation elements 7 be provided separately toward the four corners. This example is effective in terms of achieving positioning accuracy by simply realizing the reference positioning function, the anti-rotation function, and the position regulation function in the respective elements.

Moreover, the positioner 4 is more desirably configured such that the position regulation elements 7 partially function as the reference positioning element 5 or the anti-rotation element 6. This example involves using three positioning points as the positioner 4 and is effective for reducing the number of positioning points, as compared with a case where four positioning points are used.

The reference positioning element 5 is desirably provided toward a corner, of the four corners, not adjacent to the one side surface having the opening 1a. This example has the reference positioning element 5 provided toward a corner located away from the opening 1a and is effective in that the reference position for positioning may be ensured in the housing with the higher rigidity between the lower housing 3 and the upper housing 2.

Furthermore, in this example, the anti-rotation element 6 is desirably provided toward a corner, of the four corners, not adjacent to the one side surface having the opening 1a. This example has the anti-rotation element 6 provided toward a corner located away from the opening 1a and is effective in that the anti-rotation position may be ensured in the housing with the higher rigidity between the lower housing 3 and the upper housing 2.

Moreover, each position regulation element 7 is desirably configured such that the position regulation hole 7b is a long hole. This example is effective for facilitating the regulation of the position between the two corners of the one side surface having the opening 1a since the position regulation pins 7a are fittable in the two position regulation holes 7b with a clearance.

The housing structure desirably includes a guide 8 that guides the upper housing 2 relative to the lower housing 3 to bring the elements (i.e., the reference positioning element 5, the anti-rotation element 6, and the position regulation elements 7) of the positioner 4 into a contact state when the upper housing 2 is positioned on the lower housing 3. In this example, the guide 8 desirably guides the positioning process of the positioner 4. The guide 8 may be provided at either one of the lower housing 3 and the upper housing 2.

In this example, the guide 8 is desirably provided at the corner near where each element of the positioner 4 is provided.

Furthermore, with regard to the guide 8, it is desirable that the guide 8 come into contact with the opposing housing frame member before the elements of the positioner 4 are brought into the contact state. This example is designed such that the elements of the positioner 4 reach the contact state after being guided by the guide 8.

The lower housing 3 and the upper housing 2 are desirably secured to each other by using a securing unit (not shown) that secures frame members 2a and 3a of the lower housing 3 and the upper housing 2 to each other. In either one of the frame members 2a and 3a, the securing unit has securing points toward the elements of the positioner 4. In this example, the securing points of the securing unit are disposed near the positioning points of the elements of the positioner 4, so that the positions of the elements of the positioner 4 are securely maintained.

The securing unit desirably fastens the frame member 2a by using an anti-lift bracket. The anti-lift bracket in this case may be provided integrally with or separately from the frame member 2a to prevent lifting of the frame member 2a of the upper housing 2 relative to the lower housing 3 when the frame members 2a and 3a are being secured to each other. The anti-lift bracket may be of any type that has the function of preventing lifting of the frame member 2a. For example, an anti-lift bracket (not shown) extending vertically downward may be provided integrally with or separately from the frame member 2a of the upper housing 2 relative to the connection area with the frame member 3a of the lower housing 3. By fastening the anti-lift bracket with a fastening member, the frame member 2a may be restrained from moving in the lifting direction.

The device housing 1 is desirably configured such that a retrofittable reinforcement unit is bridged across the opening 1a after the upper housing 2 is positioned on the lower housing 3. This example is effective in that the rigidity near the opening 1a of the device housing 1 may be ensured. The reinforcement unit may be bridged across a part of the opening 1a or may be bridged across the entire opening 1a.

With regard to the connection area of the housing structure, the connection sections of the lower housing 3 and the upper housing 2 facing the opening 1a are desirably connected such that the lower housing 3 conforms to the shape of the upper housing 2. In this example, the lower housing 3 conforms to the shape of the upper housing 2 during the positioning of the two housings in view of the fact that the upper housing 2 has higher rigidity than the lower housing 3.

An example of the processing device is, for example, an image forming device in which the upper processing unit is an imaging unit that forms an image onto a medium and the lower processing unit is a medium feeding unit that feeds the medium to the imaging unit.

In the processing device of this type, it is desirable that the reference positioning element 5 and the anti-rotation element 6 of the positioner 4 be disposed at the side provided with a medium transport path extending from the medium feeding unit to the imaging unit. In this example, when the upper housing 2 is to be positioned on the lower housing 3, the reference position for positioning and the anti-rotation position are set in the medium transport path, so that the positioning accuracy for the medium transport path may be appropriately maintained, and the medium may be accurately fed from the medium feeding unit toward the imaging unit.

In particular, in this example, the medium transport path is desirably provided along a surface different from the one side surface having the opening 1a from the standpoint of establishing the medium transport path at an accurate location in a high rigidity region of the device housing.

Exemplary embodiments of the present disclosure will now be described below in more detail with reference to the appended drawings.

First Exemplary Embodiment

Figure 2B:
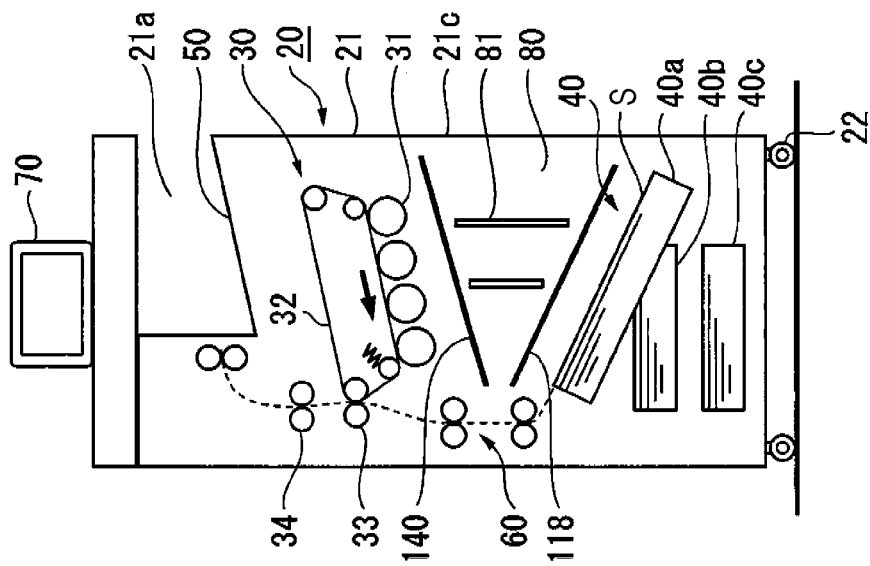
FIG. 2B illustrates the overall configuration of the image forming device shown in FIG. 2A.
Figure 2A:
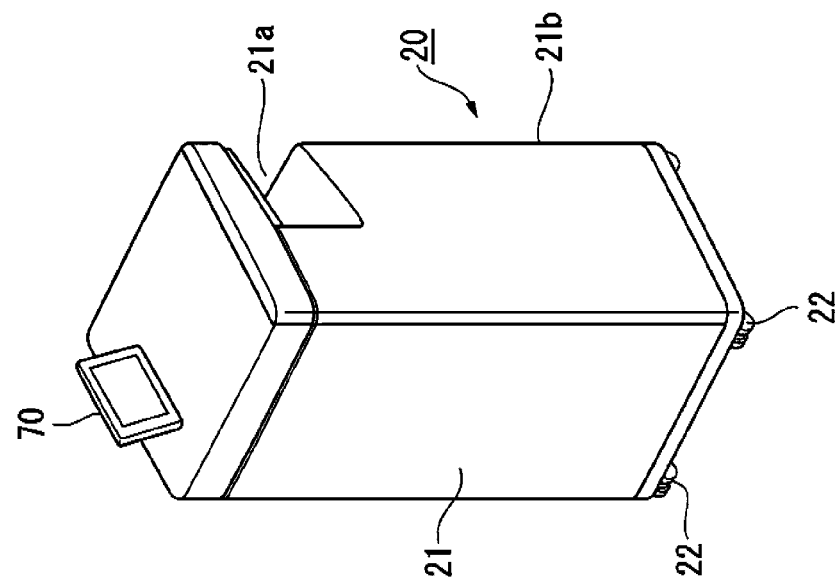
FIG. 2A is an external view of an image forming device as a processing device according to a first exemplary embodiment.

FIG. 2A illustrates the overall configuration of an image forming device serving as a processing device according to a first exemplary embodiment.
Overall Configuration of Image Forming Device In FIG. 2A, an image forming device 20 includes a device housing 21 to be transported in a movable manner by using multiple casters 22, and is equipped with elements to be used for image formation within the device housing 21.
External Appearance of Device Housing In this example, the device housing 21 is covered with an exterior member and substantially has a vertically-long rectangular parallelepiped shape. Assuming that the side where a user operates the device is defined as the front side, the device housing 21 has a cavity 21a toward the top of one side surface (i.e., the right side surface in FIG. 2A) adjacent to the front side. The device housing 21 also has an openable-closable door 21b at the front side.
Components Used for Image Formation In this example, as shown in FIG. 2B, examples of components used for image formation include an imaging engine 30 that is installed in an upper region within the device housing 21 and that forms an image onto a medium S, such as a sheet, a medium feeding unit 40 that is installed in a lower region within the device housing 21 and that feeds the medium S, such as a sheet, toward the imaging engine 30, an output medium receiver 50 that is provided by utilizing the cavity 21a of the device housing 21 and to which the medium S having the image formed thereon in the imaging engine 30 is output, a medium transport unit 60 that transports the medium S fed from the medium feeding unit 40 to the output medium receiver 50 via the imaging engine 30, and an operation panel 70 provided at the top of the device housing 21 and used for performing an operation for causing a controller that controls the imaging engine 30, the medium feeding unit 40, and the medium transport unit 60 to perform an image forming process.

In this example, as shown in FIG. 2B, the imaging engine 30 includes multiple image forming units 31 that form multiple color component images (i.e., four color images in this example, namely, yellow (Y), magenta (M), cyan (C), and black (K) color images) onto multiple photoconductors by, for example, electrophotography, a belt-like intermediate transfer member 32 to which the color component images formed by the image forming units 31 are first-transferred so as to be transported, a transfer unit 33 that transfers the first-transferred images on the intermediate transfer member 32 onto the medium S, and a fixing unit 34 that fixes the images transferred on the medium S onto the medium S.

In this example, the intermediate transfer member 32 is disposed diagonally downward toward the medium transport unit 60, and the image forming units 31 are arranged along a lower slope of the intermediate transfer member 32.

The configuration of the imaging engine 30 is not limited to that described above.

In this example, the medium feeding unit 40 includes three medium feeders 40a to 40c. In particular, in this example, the upper medium feeder 40a is inclined diagonally upward toward the medium transport unit 60 and is capable of accommodating large-size media. The middle and lower medium feeders 40b and 40c are disposed in the horizontal direction and are capable of accommodating smaller-size media than the upper medium feeder 40a. The number and the layout of medium feeders may be appropriately changed, and a medium feeder of a manual feed type may be added, where appropriate.

Furthermore, design changes may also be appropriately made with respect to the output medium receiver 50 in accordance with the output position of the medium S. Moreover, as an alternative to this example in which the medium transport unit 60 employs a transport method for forming an image onto one face of the medium S, a duplex transport module may be added so that images may be formed on both faces of the medium S.

Furthermore, in this exemplary embodiment, a space 80 that is substantially triangular in cross section is provided between the imaging engine 30 and the medium feeding unit 40 within the device housing 21, and various types of control substrates 81 are installed in this space 80.

Configuration Example of Housing Structure

Figure 3:
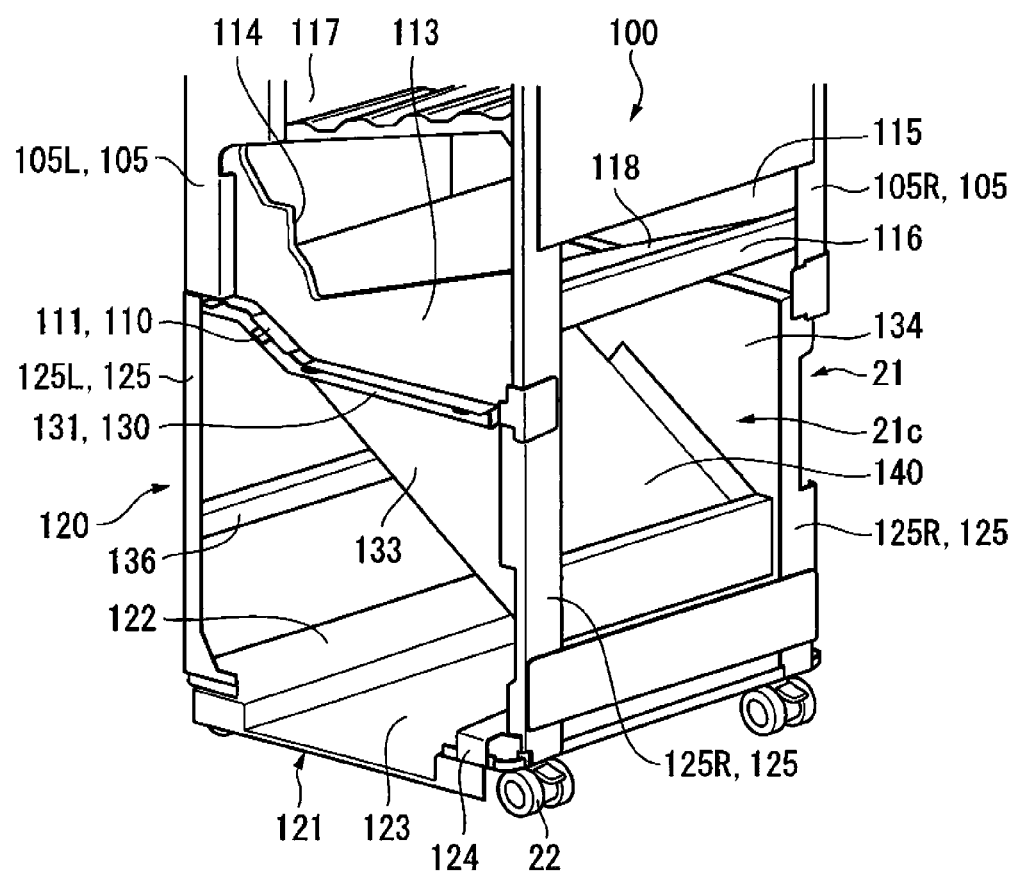
FIG. 3 illustrates a housing structure of the image forming device according to the first exemplary embodiment.
Figure 4:
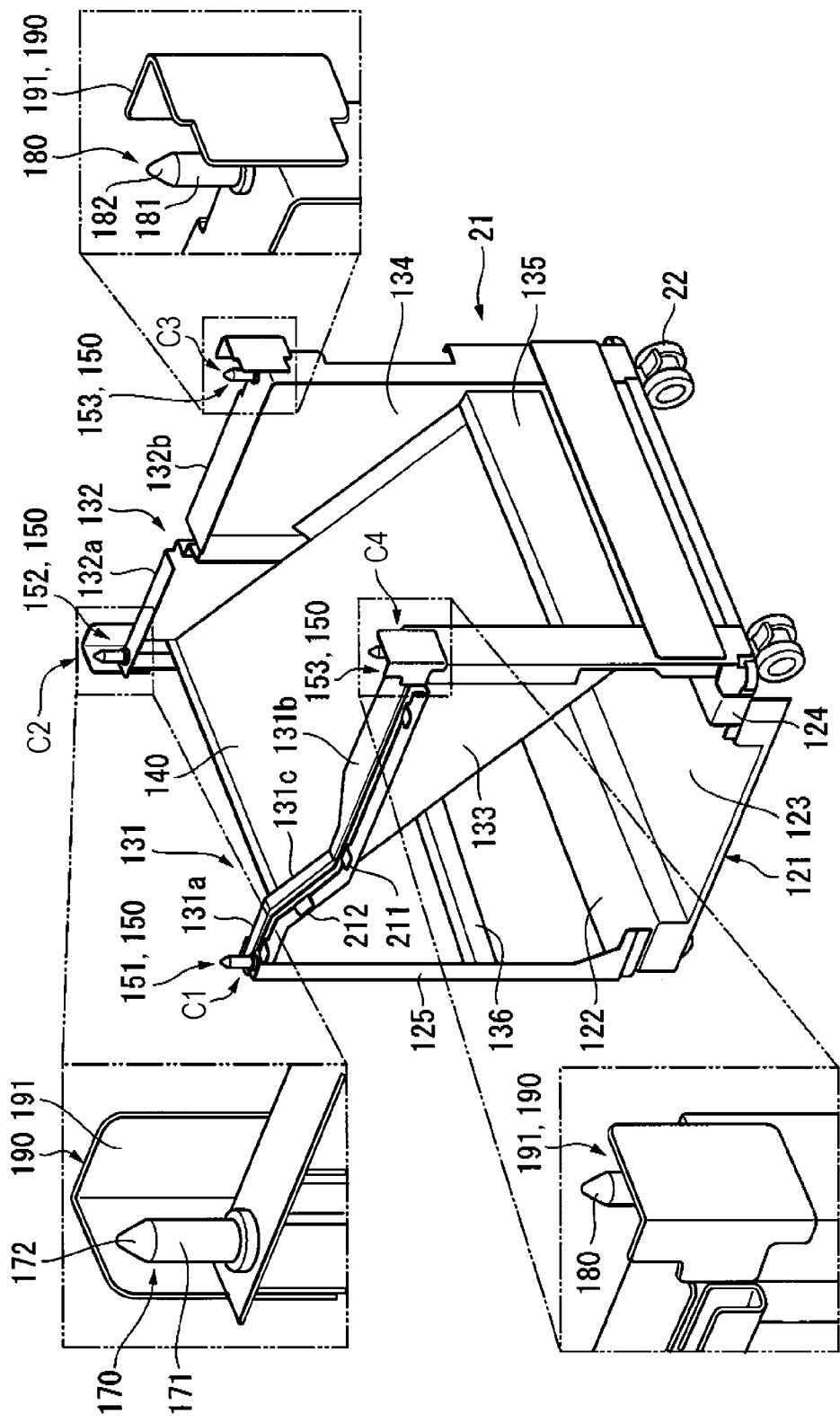
FIG. 4 illustrates a configuration example at the lower housing side of a positioning mechanism used in the first exemplary embodiment.

As shown in FIGS. 3 and 4, the housing structure of the image forming device 20 according to this exemplary embodiment is formed by splitting the device housing 21 into upper and lower components, and includes an upper housing 100 serving as the upper component of the device housing 21, a lower housing 120 serving as the lower component of the device housing 21, and a positioning mechanism 150 for positioning the upper housing 100 on the lower housing 120.

In this example, one side surface of the device housing 21 has an opening 21c extending astride the lower housing 120 and the upper housing 100. The imaging engine 30 is installed in the upper housing 100, the medium feeding unit 40 is installed in the lower housing 120, and the space 80 serving as an installation space for the various types of control substrates 81 is ensured in an area facing the opening 21c within the device housing 21.

Lower Housing

As shown in FIGS. 3 and 4, in this example, the lower housing 120 includes a bottom frame 121 serving as the bottom of the lower housing 120, column frames 125 extending upward vertically from four corners of the bottom frame 121, and an upper connection frame 130 provided above the column frames 125. The upper connection frame 130 is bridged between the column frames 125 located at opposite sides of front and rear side surfaces adjacent to the opening 21c of the device housing 21 and serves as a connection area between the lower housing 120 and the upper housing 100.

The bottom frame 121 has a cross-sectionally hat-shaped recess 123 recessed downward in a substantially rectangular bottom plate 122, and also has cross-sectionally L-shaped, cross-sectionally U-shaped, or closed-sectionally rectangular bottom frame members 124 fixed around the bottom plate 122.

The column frames 125 are formed of cross-sectionally L-shaped or U-shaped frame members. In this example, as viewed from the front side of the device housing 21, column frames 125L located at the left side have a larger height than column frames 125R located at the right side, and the right column frames 125R have a smaller height at the front side than at the rear side.

Furthermore, the upper connection frame 130 includes a front frame member 131 bridged between the left and right column frames 125L and 125R at the front side, and also includes a rear frame member 132 bridged between the left and right column frames 125L and 125R at the rear side.

In this example, since the left and right column frames 125L and 125R have different heights, the front frame member 131 has a narrow first horizontal segment 131a extending substantially horizontally from an upper area of the corresponding left column frame 125L, a second horizontal segment 131b that extends substantially horizontally from an upper area of the corresponding right column frame 125R, is located lower than the first horizontal segment 131a, and is wider than the first horizontal segment 131a, and an inclined segment 131c connecting the first horizontal segment 131a and the second horizontal segment 131b in an inclined state. The inclined segment 131c is narrow and has about the same width as the first horizontal segment 131a, and the second horizontal segment 131b gradually changes from a small width to a large width from the inclined segment 131c to the second horizontal segment 131b.

A substantially-triangular front support plate 133 extending in the vertical direction is fixed between the second horizontal segment 131b of the front frame member 131 and the corresponding right column frame 125R.

Because the left and right column frames 125L and 125R have slightly different heights, the rear frame member 132 has a narrow first horizontal segment 132a extending substantially horizontally from an upper area of the corresponding left column frame 125L and a wide second horizontal segment 132b extending substantially horizontally from an upper area of the corresponding right column frame 125R, but is disposed with a small step between the first horizontal segment 132a and the second horizontal segment 132b such that a gap exists between the first horizontal segment 132a and the second horizontal segment 132b.

However, a rear support plate 134 is fixed between the left and right column frames 125L and 125R at the rear side. The rear support plate 134 has a flat plate member extending substantially in the vertical direction, supports the first horizontal segment 132a and the second horizontal segment 132b of the rear frame member 132, and also supports the gap between the first horizontal segment 132a and the second horizontal segment 132b by using a stepped bent section provided at an intermediate area of the flat plate member.

Furthermore, in this example, a tie rod 135 extending in the front-rear direction is appropriately bridged across a lower region between the right column frames 125R, and a tie rod 136 extending in the front-rear direction is appropriately bridged between the left column frames 125L.

The lower housing 120 is provided with a partition plate 140 serving as a partition between the medium feeding unit 40 and the space 80.

Upper Housing

Figure 5:
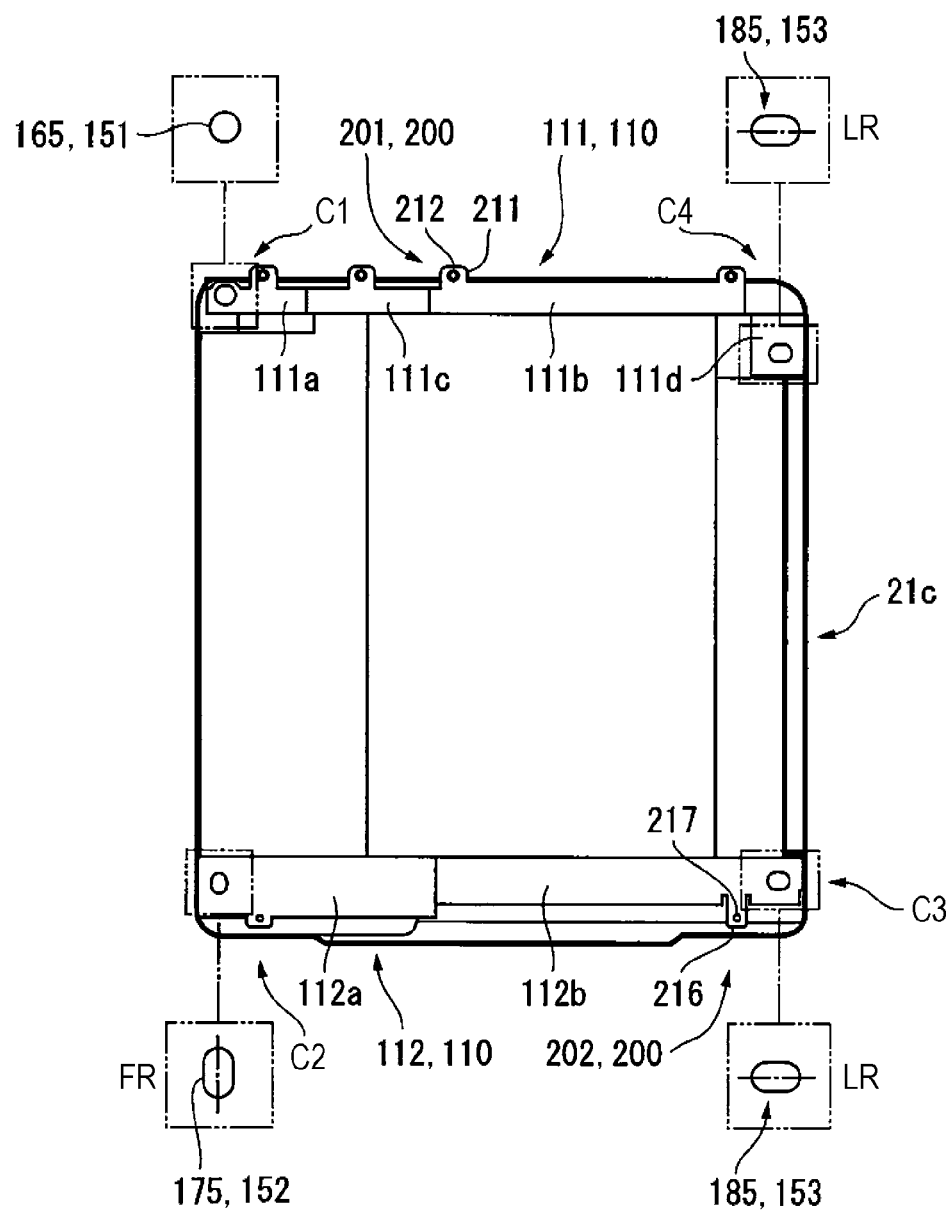
FIG. 5 is a bottom view of a configuration example at the upper housing side of the positioning mechanism used in the first exemplary embodiment.

In this example, as shown in FIGS. 3 and 5, the upper housing 100 includes a top frame (not shown) serving as the top of the upper housing 100, column frames 105 extending downward vertically from four corners of the top frame, and a lower connection frame 110 provided below the column frames 105. The lower connection frame 110 is bridged between the column frames 105 located at opposite sides of front and rear side surfaces adjacent to the opening 21c of the device housing 21 and serves as a connection area between the upper housing 100 and the lower housing 120.

In this example, the top frame may include cross-sectionally L-shaped or U-shaped top frame members fixed around a substantially rectangular top plate.

The column frames 105 are formed of cross-sectionally L-shaped or U-shaped frame members. In this example, as viewed from the front side of the device housing 21, column frames 105L located at the left side have a length, in the height direction extending downward from the top frame, smaller than the length, in the height direction, of column frames 105R located at the right side, and the right column frames 105R have a larger length in the height direction at the front side than at the rear side.

Furthermore, the lower connection frame 110 includes a front frame member 111 bridged between the left and right column frames 105L and 105R at the front side, and also includes a rear frame member 112 bridged between the left and right column frames 105L and 105R at the rear side. FIG. 5 is a bottom view of the upper housing 100. In FIG. 5, the upper side indicates the front side of the upper housing 100, and the lower side indicates the rear side of the upper housing 100.

In this example, the front frame member 111 is in contact with the front frame member 131 of the lower housing 120 and includes a first horizontal segment 111a, a second horizontal segment 111b, and an inclined segment 111c. In this example, a third horizontal segment 111*d* having a flat surface similar to the second horizontal segment 111*b* but bent toward the opposite side from the second horizontal segment 111*b* with respect to a front frame 113, to be described later, extending in the vertical direction is provided, and is disposed in contact with the second horizontal segment 131*b* of the front frame member 131 of the lower housing 120.

The rear frame member 112 is in contact with the rear frame member 132 of the lower housing 120 and includes a first horizontal segment 112*a* and a second horizontal segment 112*b* connected to the first horizontal segment 112*a* with a step therebetween.

Furthermore, in this example, the plate-like front frame 113 extending in the left-right direction is bridged between the left and right column frames 105L and 105R at the front side, and the front frame member 111 is provided integrally with or separately from the lower edge of the front frame 113. Reference sign 114 denotes a detachment port provided in the front frame 113 and used for detaching the intermediate transfer member 32 and the image forming units 31.

Moreover, a plate-like rear frame 115 extending in the left-right direction is bridged between the left and right column frames 105L and 105R at the rear side.

In this example, a tie rod 116 extending in the front-rear direction is appropriately bridged between the right column frames 105R to extend across the opening 21*c*, and a tie rod 117 extending in the front-rear direction is appropriately bridged between the left column frames 105L.

The upper housing 100 is provided with a partition plate 118 serving as a partition between the imaging engine 30 and the space 80.

Positioning Mechanism

Configuration Example of Positioning Mechanism

As shown in FIGS. 4 to 7, in this exemplary embodiment, the positioning mechanism 150 includes a reference positioning element 151, an anti-rotation element 152, and position regulation elements 153. The reference positioning element 151 is provided at one corner C1 located opposite the opening 21*c* of the device housing 21 among the four corners of the connection area between the lower housing 120 and the upper housing 100, and serves as a reference position for positioning. The anti-rotation element 152 is provided at a corner C2, of the four corners, located opposite the opening 21*c* of the device housing 21 and adjacent to the reference positioning element 151, and suppresses rotation of the upper housing 100 relative to the lower housing 120 about the reference positioning element 151. The position regulation elements 153 are respectively provided at corners C3 and C4, of the four corners, located at opposite sides of the opening 21*c* such that one side surface having the opening 21*c* is interposed between the corners C3 and C4. The position regulation elements 153 positionally regulate the corners C3 and C4 located at the opposite sides of the opening 21*c*.

Reference Positioning Element

As shown in FIGS. 4 to 6, in this example, the reference positioning element 151 has a positioning reference pin 160 extending in the vertical direction and provided at the first horizontal segment 131*a* of the front frame member 131 located at the corner C1 of the lower housing 120, and also has a reference hole 165 that receives the positioning reference pin 160 and that is provided in the first horizontal segment 111*a* of the front frame member 111 located at the corner C1 of the upper housing 100.

The positioning reference pin 160 includes a columnar pin body 161 and a conical pin protrusion 162 integrated with the distal end of the pin body 161, and is fixed to a predetermined location of the front frame member 131 by welding or by using a fastening member.

The reference hole 165 is a circular hole having the same diameter as the pin body 161 of the positioning reference pin 160, and the positioning reference pin 160, when fitted in the reference hole 165, is positioned at the center of the reference hole 165.

Anti-Rotation Element

In this example, as shown in FIGS. 4 to 6, the anti-rotation element 152 has an anti-rotation pin 170 extending in the vertical direction and provided at the first horizontal segment 132*a* of the rear frame member 132 located at the corner C2 of the lower housing 120, and also has an anti-rotation hole 175 provided in the first horizontal segment 112*a* of the rear frame member 112 located at the corner C2 of the upper housing 100. The anti-rotation hole 175 receives the anti-rotation pin 170 and is a long hole extending in a direction (corresponding to a front-rear direction FR in this example) connecting the center of the reference positioning element 151 and the center of the anti-rotation pin 170.

Similar to the positioning reference pin 160, the anti-rotation pin 170 also has a columnar pin body 171 and a conical pin protrusion 172.

The anti-rotation hole 175 may have the same diameter as the anti-rotation pin 170 with respect to the rotational direction about the reference positioning element 151, and may be set to at least have a clearance larger than an assembly tolerance in a direction (corresponding to the front-rear direction of the device housing 21 in this example) orthogonal to the anti-rotational direction (corresponding to the left-right direction of the device housing 21 in this example).

Position Regulation Elements

In this example, as shown in FIGS. 4 to 6, the position regulation elements 153 are respectively provided at the corners C3 and C4 located at the opposite sides of the opening 21*c*.

The position regulation element 153 located at the corner C3 has a position regulation pin 180 extending in the vertical direction and provided at the second horizontal segment 132*b* of the rear frame member 132 of the lower housing 120, and also has a position regulation hole 185 provided in the second horizontal segment 112*b* of the rear frame member 112 of the upper housing 100. The position regulation hole 185 is a long hole extending in a left-right direction LR intersecting the front-rear direction FR when the position regulation pin 180 is fitted in the position regulation hole 185.

Furthermore, in this example, the position regulation element 153 located at the corner C4 has a position regulation pin 180 extending in the vertical direction and provided at the second horizontal segment 131*b* of the front frame member 131 of the lower housing 120, and also has a position regulation hole 185 provided in the second horizontal segment 111*b* of the front frame member 111 of the upper housing 100. The position regulation hole 185 is a long hole extending in the left-right direction LR intersecting the front-rear direction FR when the position regulation pin 180 is fitted in the position regulation hole 185.

Similar to the positioning reference pin 160, the position regulation pin 180 also has a columnar pin body 181 and a conical pin protrusion 182.

The position regulation hole 185 may have the same diameter as the position regulation pin 180 with respect to the front-rear direction (FR) extending along the one side surface having the opening 21c, and may be set to at least have a clearance larger than an assembly tolerance in the left-right direction (LR) orthogonal to the front-rear direction FR.

Guide Mechanisms

In this example, the three corners C2 to C4 provided with the anti-rotation element 152 and the position regulation elements 153 of the positioning mechanism 150 are individually provided with guide mechanisms 190 that guide the upper housing 100 relative to the lower housing 120 to bring the anti-rotation element 152 and the position regulation elements 153 into a contact state when the upper housing 100 is positioned on the lower housing 120.

In this example, as shown in FIGS. 4 to 9, at the corners C2 to C4 of the front frame member 131 and the rear frame member 132 of the lower housing 120, the guide mechanisms 190 have cross-sectionally L-shaped guide plates 191 surrounding the anti-rotation pin 170 of the anti-rotation element 152 and the position regulation pin 180 of the position regulation elements 153 from the outside. The lower area of each guide plate 191 is fixed to the upper area of the corresponding column frame 125 by using a fastening member 192.

Figure 9A:
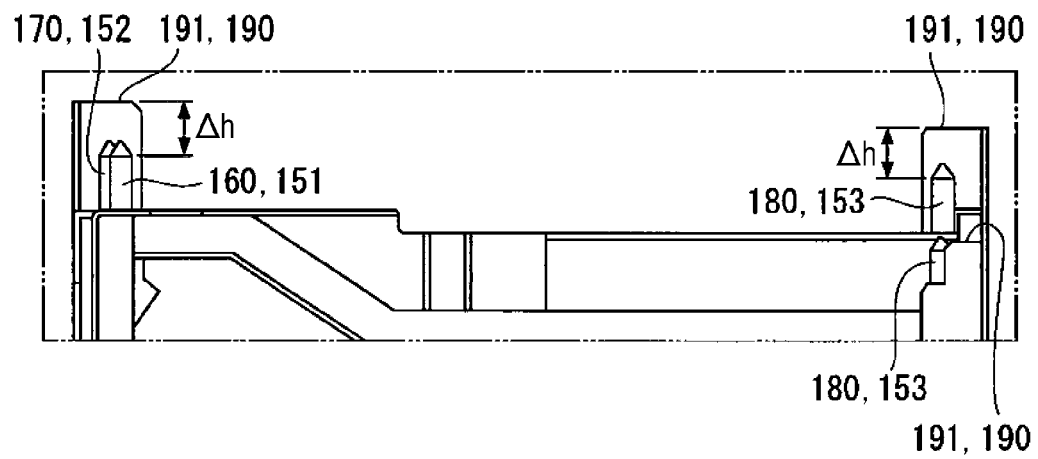
FIG. 9A is a diagram explaining a guiding function by guide mechanisms added to the positioning mechanism in the housing structure according to the first exemplary embodiment, as viewed from a direction indicated with an arrow IX in FIG. 8A.

As shown in FIG. 9A, each guide plate 191 may be positioned higher than the upper end of the pin body 171 or 181 of the anti-rotation pin 170 or the position regulation pin 180 by Δh. Specifically, before the anti-rotation element 152 and the position regulation elements 153 are brought into a contact state, the guide plates 191 may come into contact with the opposing housing frame members (i.e., the front frame member 111 and the rear frame member 112 of the upper housing 100 in this example) and guide the pins (i.e., the anti-rotation pin 170 and the position regulation pin 180) and the holes (i.e., the anti-rotation hole 175 and the position regulation hole 185) of the anti-rotation element 152 and the position regulation elements 153 to bring them into contact with each other.

Figure 9B:
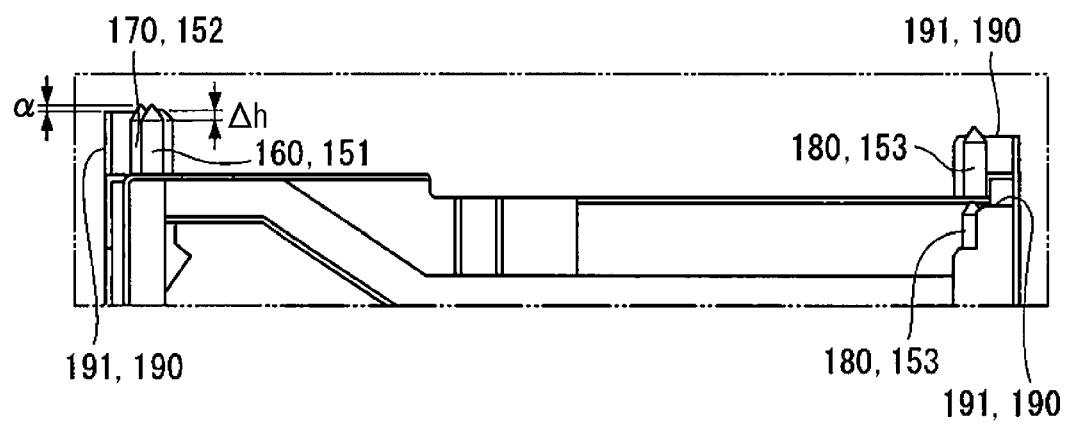
FIG. 9B illustrates a modification of the guide mechanisms.

In this example, the anti-rotation pin 170 and the position regulation pin 180 both have the conical pin protrusions 172 and 182 at the distal ends of the pin bodies 171 and 181, respectively. Thus, assuming that each guide plate 191 is positioned lower than the distal end of the anti-rotation pin 170 or the position regulation pin 180 (i.e., the distal end of the pin protrusion 172 or 182) by a, as shown in FIG. 9B, if the guide plate 191 protrudes upward relative to the pin body 171 or 181, the guiding performance of the guide mechanism 190 may still be maintained.

Fastening Mechanism

In this example, when the upper housing 100 is positioned on the lower housing 120, the upper housing 100 is fastened to the lower housing 120 by using a fastening mechanism 200 as a securing unit.

In this example, as shown in FIGS. 3 to 7, the fastening mechanism 200 includes a front fastener 201 provided between the front frame member 131 of the upper connection frame 130 of the lower housing 120 and the front frame member 111 of the lower connection frame 110 of the upper housing 100, and also includes a rear fastener 202 provided between the rear frame member 132 of the upper connection frame 130 and the rear frame member 112 of the lower connection frame 110.

In detail, in the front fastener 201, the front edge of the front frame member 131 of the upper connection frame 130 may have multiple (four in this example) attachment segments 211 protruding forward and spaced apart in the left-right direction. Each of the attachment segments 211 may be provided with an attachment hole 212. On the other hand, the front edge of the front frame member 111 of the lower connection frame 110 may have attachment segments 213 and attachment holes 214 corresponding to the attachment segments 211 and the attachment holes 212 of the upper connection frame 130. The attachment segments 211 and 213 may be disposed one on top of the other and be fastened to each other by using fastening members 215, such as screws, inserted into the attachment holes 212 and 214 from the up-down direction.

In the rear fastener 202, the rear edge of the rear frame member 132 of the upper connection frame 130 may have multiple (two in this example) attachment segments 216 protruding rearward and spaced apart in the left-right direction. Each of the attachment segments 216 may be provided with an attachment hole 217. On the other hand, the rear edge of the rear frame member 112 of the lower connection frame 110 may have attachment segments 218 and attachment holes 219 corresponding to the attachment segments 216 and the attachment holes 217 of the upper connection frame 130. The attachment segments 216 and 218 may be disposed one on top of the other and be fastened to each other by using fastening members (not shown), such as screws, inserted into the attachment holes 217 and 219 from the up-down direction.

Positioning Process By Positioning Mechanism

Next, a positioning process by the positioning mechanism 150 will be described.

Figure 8A:
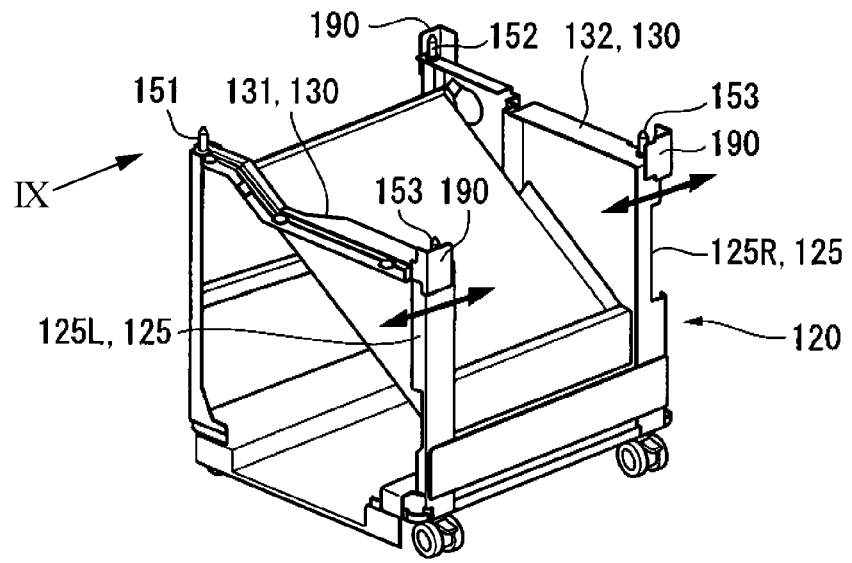
FIG. 8A is a diagram explaining that the side with an opening in the lower housing of the device housing is an area with low rigidity in a front-rear direction.
Figure 8B:
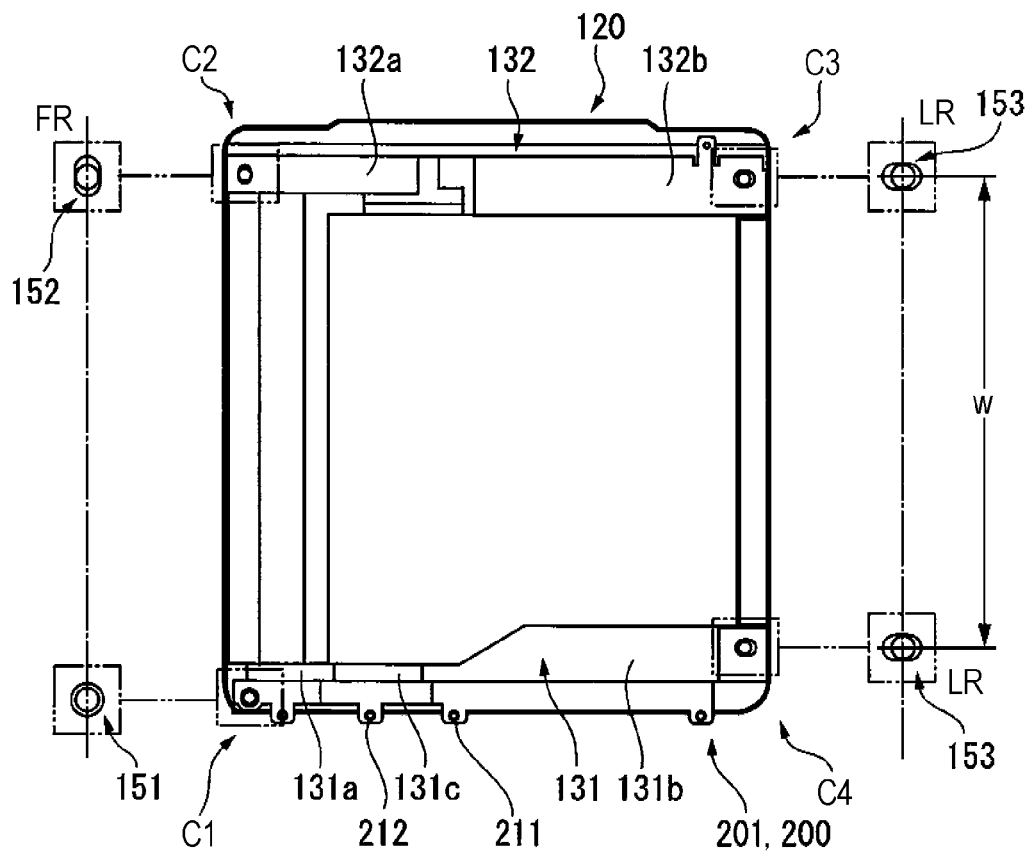
FIG. 8B illustrates positioning functions by the positioning mechanism according to the first exemplary embodiment.

As shown in FIGS. 6 to 8, when the upper housing 100 is to be positioned on the lower housing 120, the lower connection frame 110 of the upper housing 100 may be placed on the upper connection frame 130 of the lower housing 120.

In this case, the positioning functions according to the reference positioning element 151, the anti-rotation element 152, and the position regulation elements 153 are implemented at the four corners of the connection area between the lower housing 120 and the upper housing 100.

First, at the corner C1, the reference positioning element 151 sets a reference position for positioning the upper housing 100 relative to the lower housing 120 by inserting the positioning reference pin 160 into the reference hole 165.

Concurrently, at the corner C2, the anti-rotation element 152 inserts the anti-rotation pin 170 into the anti-rotation hole 175 and positionally restrains the anti-rotation pin 170 with respect to the anti-rotational direction (i.e., the left-right direction LR of the device housing 21 in this example), so as to prevent the upper housing 100 from rotating relative to the lower housing 120 about the reference positioning element 151. Because the anti-rotation hole 175 is a long hole having a clearance in the front-rear direction of the device housing 21, the anti-rotation pin 170 is positionally adjusted in the longitudinal direction of the anti-rotation hole 175 even if the reference positioning element 151 or the anti-rotation element 152 has a component tolerance.

Furthermore, at the corners C3 and C4, the position regulation elements 153 insert the position regulation pins 180 into the position regulation holes 185 to positionally restrain the position regulation pins 180 with respect to a direction (corresponding to the front-rear direction FR of the device housing 21) extending along the one side surface having the opening 21c, thereby positionally regulating the corners C3 and C4 located at the opposite sides of the opening 21c and setting a span w between the corners C3 and C4 to a predetermined value. Because each position regulation hole 185 is a long hole having a clearance in the left-right direction of the device housing 21, the position regulation pin 180 is positionally adjusted in the longitudinal direction of the position regulation hole 185 even if each element of the positioning mechanism 150 has a component tolerance.

Accordingly, in this exemplary embodiment, the reference positioning element 151, the anti-rotation element 152, and the position regulation elements 153 individually implement functions for the positioning process at the four corners C1 to C4 of the connection area between the lower housing 120 and the upper housing 100, whereby the positioning process is stably performed by the positioning mechanism 150.

Housing Structure at Opposite Sides of Opening

In this example, when the upper housing 100 is positioned on the lower housing 120, the opening 21c extending astride the lower housing 120 and the upper housing 100 is formed in one side surface of the device housing 21. Based on a rigidity comparison at the connection area between the lower housing 120 and the upper housing 100 facing the opening 21c, the tie rod 135 extending across the opening 21c of the lower housing 120 is disposed in a lower region of the right column frames 125R, and the column frames 125R protrude upward relative to the tie rod 135 by a relatively large length accordingly.

In contrast, the tie rod 116 extending across the opening 21c of the upper housing 100 is disposed in a lower region of the right column frames 105R, and the column frames 105R protrude downward relative to the tie rod 116 by a relatively small length accordingly.

Therefore, even if the lower housing 120 and the upper housing 100 are formed by using plate members of the same material and the same thickness, the column frames 105R of the upper housing 100 facing the opening 21c at the connection area between the lower housing 120 and the upper housing 100 are assumed to have higher rigidity than the column frames 125R of the lower housing 120.

Therefore, in this example, at the corners C3 and C4 located at the opposite sides of the opening 21c of the device housing 21 among the four corners of the connection area between the lower housing 120 and the upper housing 100, the position regulation elements 153 positionally regulate the corners C3 and C4 located at the opposite sides of the opening 21c, so that the lower housing 120 facing the opening 21c is connected to the upper housing 100 in a state where the connection area of the lower housing 120 conforms to the shape of the connection area of the upper housing 100.

Guiding Process By Guide Mechanisms

In this exemplary embodiment, the positioning mechanism 150 includes the guide mechanisms 190, so that the positioning process is stably performed by the positioning mechanism 150.

Specifically, in this example, when the elements (i.e., the reference positioning element 151, the anti-rotation element 152, and the position regulation elements 153) of the positioning mechanism 150 are to be brought into a contact state, the guide mechanisms 190 cause the opposing housing frame members (corresponding to the lower connection frame 110 of the upper housing 100) to come into contact with the guide plates 191 and guide the opposing housing frame members along guide paths regulated by the guide plates 191, thereby causing the elements of the positioning mechanism 150 to exhibit their functions.

Fastening Process By Fastening Mechanism

When the positioning process by the positioning mechanism 150 is completed, a fastening process may be performed by the fastening mechanism 200, as shown in FIGS. 5 to 7.

In this example, the lower housing 120 and the upper housing 100 are secured to each other at multiple front and rear locations in the left-right direction by using the front fastener 201 and the rear fastener 202.

The front fastener 201 fastens the front frame member 131 of the upper connection frame 130 and the front frame member 111 of the lower connection frame 110 to each other at multiple (four in this example) securing points P by using fastening members 215 from the up-down direction.

The rear fastener 202 fastens the rear frame member 132 of the upper connection frame 130 and the rear frame member 112 of the lower connection frame 110 to each other at multiple (two in this example) securing points P by using fastening members (not shown) from the up-down direction.

Accordingly, the lower housing 120 and the upper housing 100 are positioned relative to each other by the positioning mechanism 150, and are fastened to each other by the fastening mechanism 200.

In particular, as shown in FIG. 6, the front fastener 201 and the rear fastener 202 desirably have the securing points P near the four corners C1 to C4 of the connection area between the lower housing 120 and the upper housing 100, so that the distance between each securing point P and a corresponding positioning point Q may be reduced and that the positioning point Q may be maintained at an accurate position by the securing point P accordingly.

In this example where the device housing 21 has the opening 21c extending astride the upper housing 100 and the lower housing 120 when the upper housing 100 is positioned on the lower housing 120, it is desirable that a retrofittable reinforcement unit (such as a tie rod or a support frame) be bridged across the opening 21c to increase the rigidity of the device housing 21 in accordance with the side member for the opening 21c.

Second Exemplary Embodiment

Figure 10:
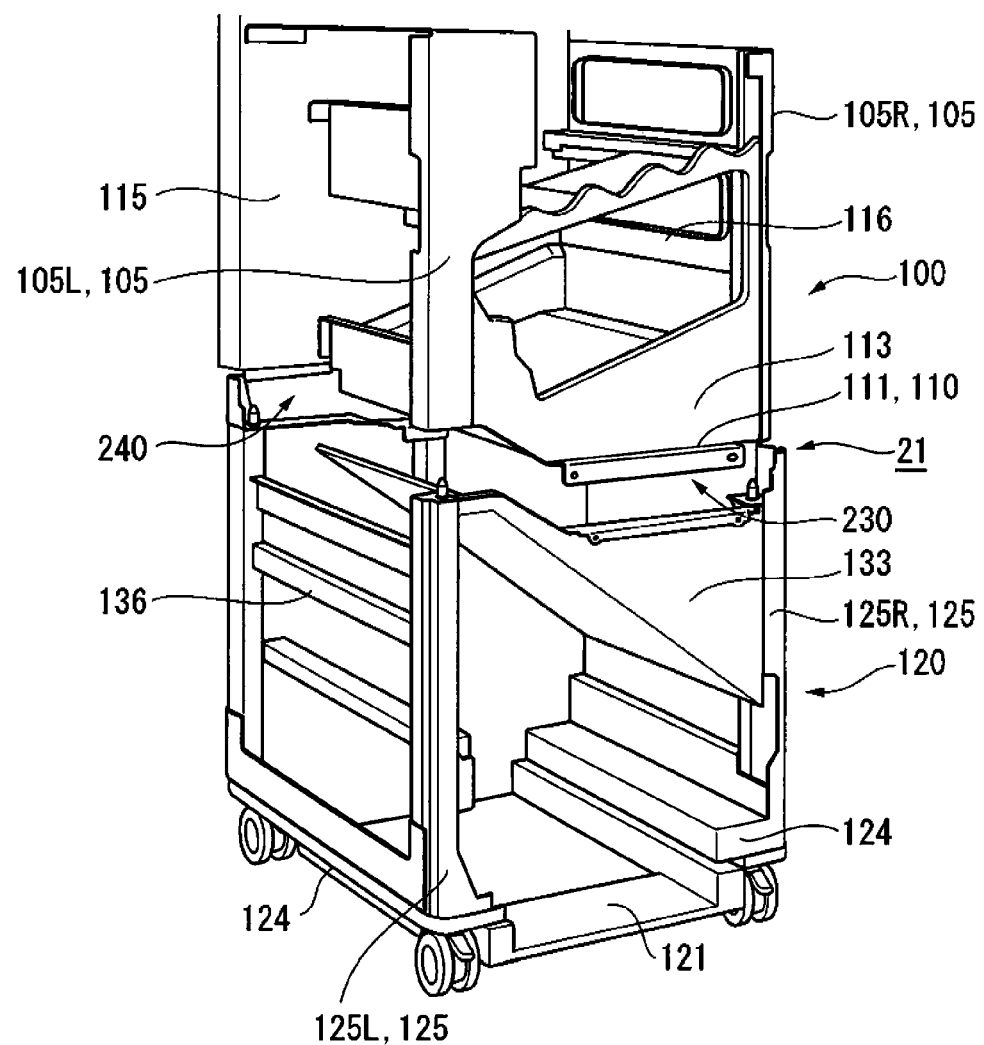
FIG. 10 illustrates the overall configuration of a device housing used in a processing device according to a second exemplary embodiment.
Figure 12:
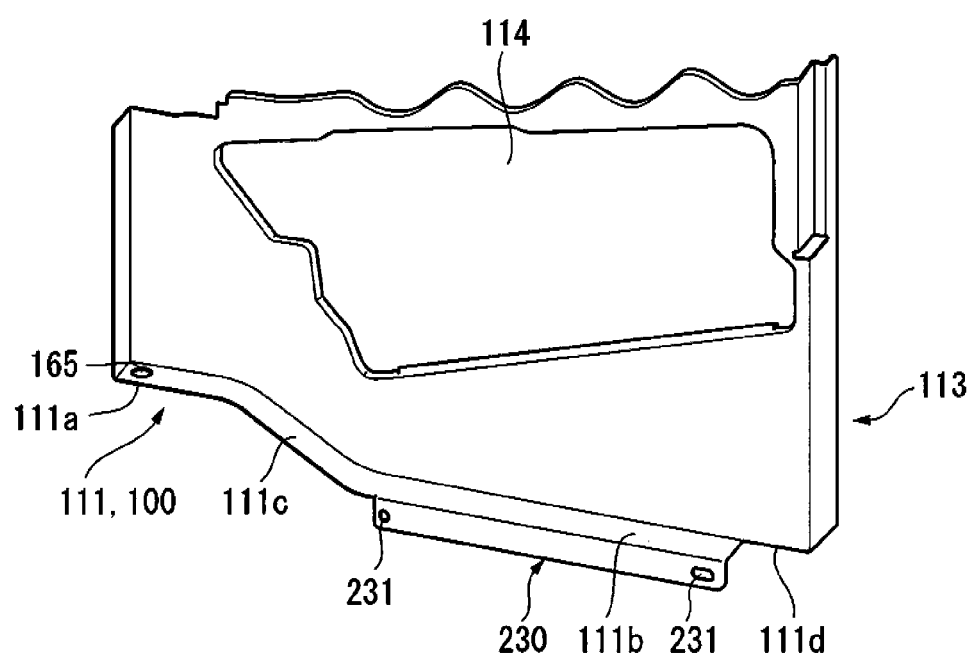
FIG. 12 illustrates a front frame of the upper housing.

FIG. 10 illustrates a configuration example of a housing structure used in an image forming device according to a second exemplary embodiment.

In FIG. 10, the device housing 21 has the upper housing 100 and the lower housing 120 that are substantially similar to those in the first exemplary embodiment, and the upper housing 100 is fastened to the lower housing 120 using the fastening mechanism 200 after being positioned on the lower housing 120 via the positioning mechanism 150. However, the fastening mechanism 200 is different from that in the first exemplary embodiment. Components similar to those in the first exemplary embodiment are given the same reference signs as those in the first exemplary embodiment, and detailed descriptions thereof are omitted.

In this example, the lower housing 120 has the upper connection frame 130 (i.e., the front frame member 131 and the rear frame member 132), the upper housing 100 has the lower connection frame 110 (i.e., the front frame member 111 and the rear frame member 112), and the upper connection frame 130 and the lower connection frame 110 are equipped with the fastening mechanism 200 (i.e., the front fastener 201 and the rear fastener 202).

Figure 13A:
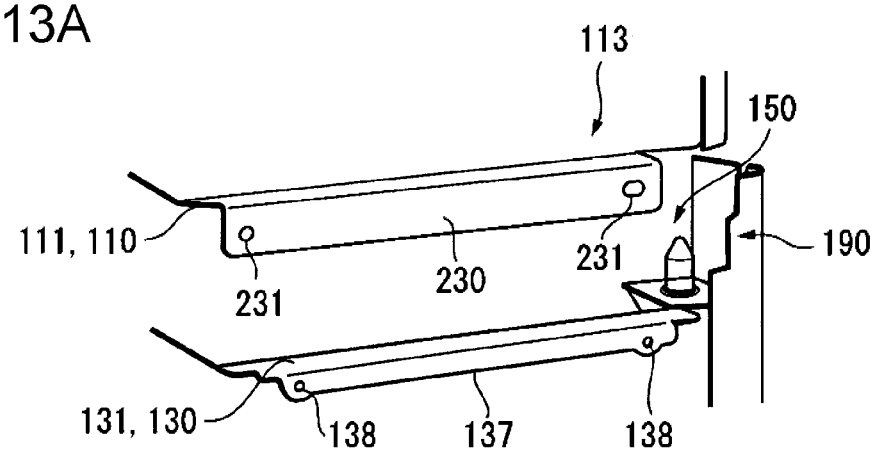
FIG. 13A illustrates a configuration example of an anti-lift bracket used when fastening the lower housing and the upper housing to each other.

As shown in FIGS. 10 and 13A, the front fastener 201 has an attachment flange 137 serving as a component of the lower housing 120 and bent vertically downward at the front edge of the second horizontal segment 131b of the front frame member 131 of the upper connection frame 130, and the attachment flange 137 is provided with attachment holes 138 to be used with multiple fastening members.

Furthermore, as shown in FIGS. 10 to 13B, the front fastener 201 has an attachment bracket 230 serving as a component of the upper housing 100 and bent vertically downward at the front edge of the second horizontal segment 111b of the front frame member 111 of the lower connection frame 110, and the attachment bracket 230 is provided with attachment holes 231 to be used with multiple fastening members.

As shown in FIGS. 10 to 11B, the rear fastener 202 has an attachment flange (not shown) serving as a component of the lower housing 120 and bent vertically downward at the rear edge of the rear frame member 132 of the upper connection frame 130, and the attachment flange is provided with attachment holes (not shown) to be used with multiple fastening members.

Furthermore, as shown in FIGS. 10 to 11B, the rear fastener 202 has an attachment bracket 240 serving as a component of the upper housing 100 and bent vertically downward at the rear edge of the rear frame member 112 of the lower connection frame 110, and the attachment bracket 240 is provided with attachment holes (not shown) to be used with multiple fastening members. The attachment brackets 230 and 240 may be additionally attached components, and at least one of the multiple attachment holes 231 is desirably a long hole from the standpoint of absorbing a component tolerance.

Next, a fastening process by the fastening mechanism 200 used in this exemplary embodiment will be described.

Figure 13B:
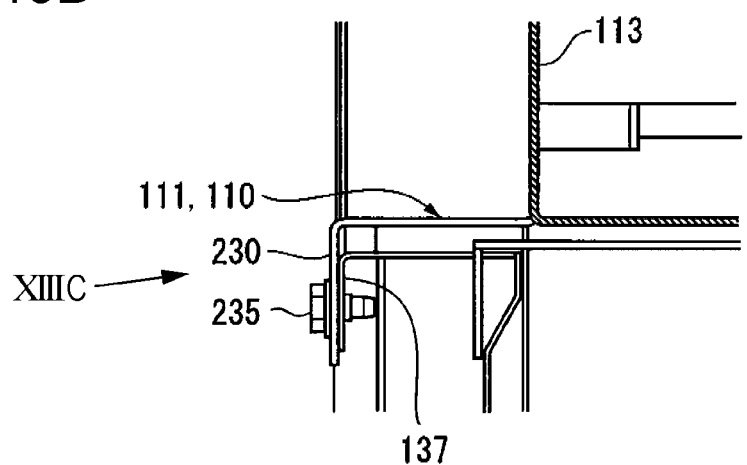
FIG. 13B illustrates an example where the lower and upper housings are fastened to each other by using the anti-lift bracket.
Figure 13C:
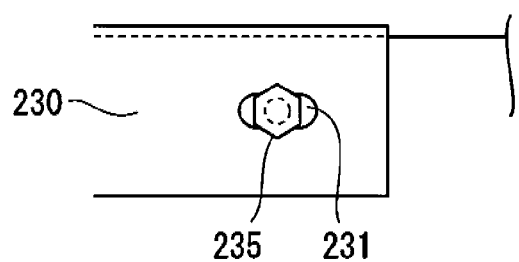
FIG. 13C is a diagram as viewed from a direction indicated by an arrow XIIIC in FIG. 13B.

First, with regard to the front fastener 201, for example, as shown in FIGS. 13A to 13C, the front frame member 111 of the lower connection frame 110 of the upper housing 100 may be positioned on the front frame member 131 of the upper connection frame 130 of the lower housing 120 by using the positioning mechanism 150. Subsequently, the attachment bracket 230 of the lower connection frame 110 of the upper housing 100 may be disposed over the attachment flange 137 of the upper connection frame 130 of the lower housing 120, and fastening members 235, such as screws, may be inserted horizontally into the attachment holes 231 in the attachment bracket 230 and the attachment holes 138 in the attachment flange 137, thereby fastening the attachment bracket 230 to the attachment flange 137.

With regard to the rear fastener 202, a fastening process substantially similar to that of the front fastener 201 may be performed. After the positioning process by the positioning mechanism 150 is completed, the attachment bracket 240 of the lower connection frame 110 of the upper housing 100 may be disposed over the attachment flange (not shown) of the upper connection frame 130 of the lower housing 120, and fastening members (not shown), such as screws, may be inserted horizontally into the attachment holes (not shown) in the attachment bracket 240 and the attachment holes 138 in the attachment flange, thereby fastening the attachment bracket 240 to the attachment flange (not shown).

Accordingly, in this exemplary embodiment, the attachment brackets 230 and 240 extending vertically downward from the lower connection frame 110 of the upper housing 100 are used as the fastening mechanism 200 against the attachment segments provided at the upper connection frame 130 of the lower housing 120, and the attachment brackets 230 and 240 are fastened to the attachment segments by horizontally inserting the fastening members 235, so that the fastening members 235 are fastened in a state where they intersect the lifting direction of the lower connection frame 110 of the upper housing 100. Thus, lifting of the lower connection frame 110 may be effectively suppressed, so that it is conceivable that the attachment brackets 230 and 240 effectively function as anti-lift brackets.

In this exemplary embodiment, the positioning mechanism 150 may include the reference positioning element 151, the anti-rotation element 152, and the position regulation elements 153. However, the positioning mechanism 150 is not limited to the example described in the first exemplary embodiment, and may be modified to examples to be described below in first to sixth modifications.

First Modification

Figure 14A:
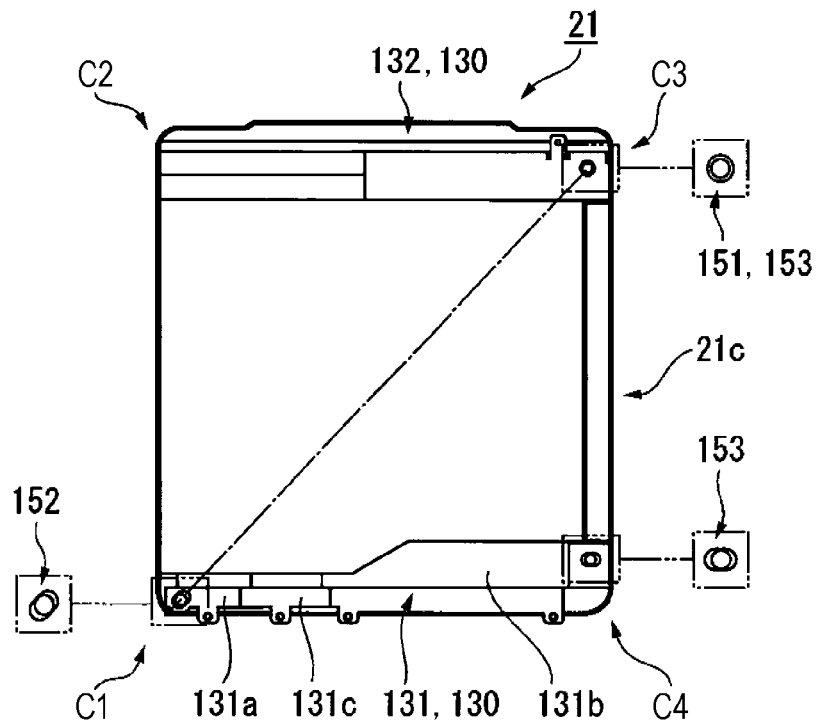
FIG. 14A illustrates a relevant part of a positioning mechanism according to a first modification.

FIG. 14A illustrates a positioning mechanism according to a first modification.

In FIG. 14A, the positioning mechanism 150 indicates an example where it has three positioning points instead of four positioning points.

In FIG. 14A, for example, the positioning mechanism 150 is provided with the reference positioning element 151 (i.e., the positioning reference pin 160 and the reference hole 165) at one of the corners (i.e., C3 in this example) facing the opening 21c of the device housing 21 among the four corners of the connection area between the lower housing 120 and the upper housing 100, the anti-rotation element 152 (i.e., the anti-rotation pin 170 and the anti-rotation hole 175) at the corner C1 located on a diagonal line relative to the reference positioning element 151, and the position regulation elements 153 (i.e., the position regulation pins 180 and the position regulation holes 185) at the corners C3 and C4 located at the opposite sides of the opening 21c.

In this example, the anti-rotation hole 175 of the anti-rotation element 152 may be a long hole extending in the direction of a line connecting the center of the reference positioning element 151 and the center of the anti-rotation pin 170, and the position regulation elements 153 also function as the reference positioning element 151 at the corner C3 and include the position regulation hole 185 as a long hole extending in the left-right direction and the position regulation pin 180 at the corner C4. In this modification, the span between the corners C3 and C4 located at the opposite sides of the opening 21c may also be regulated.

Second Modification

Figure 14B:
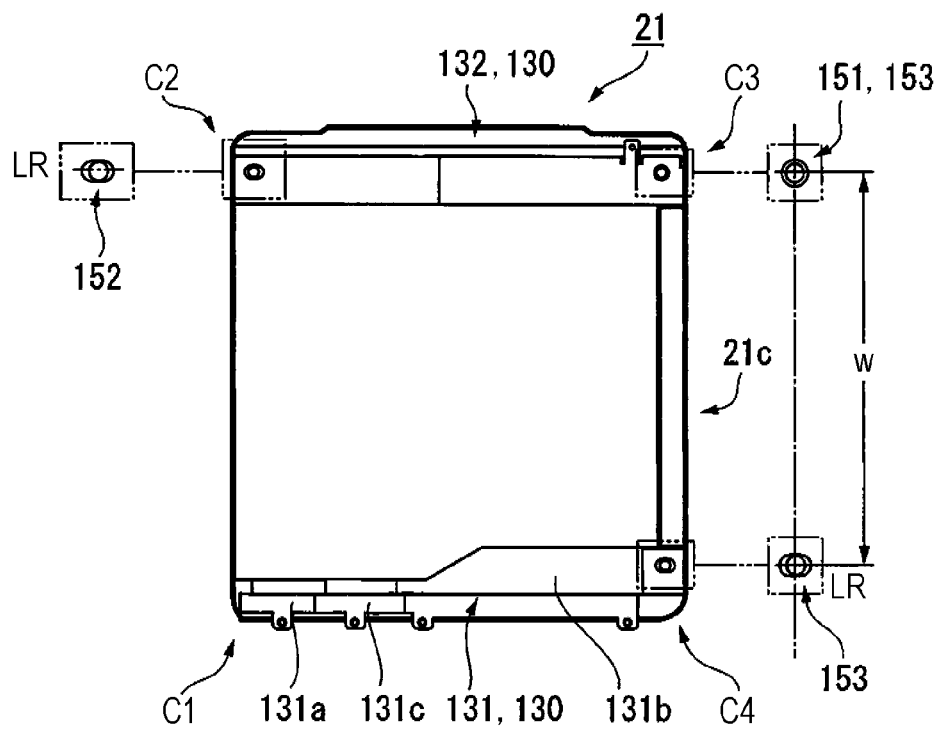
FIG. 14B illustrates a relevant part of a positioning mechanism according to a second modification.

FIG. 14B illustrates a positioning mechanism according to a second modification.

In FIG. 14B, the positioning mechanism 150 indicates another example where it has three positioning points instead of four positioning points.

In this example, the positioning mechanism 150 is provided with the reference positioning element 151 (i.e., the positioning reference pin 160 and the reference hole 165) at one of the corners (i.e., C3 in this example) facing the opening 21c of the device housing 21 among the four corners of the connection area between the lower housing 120 and the upper housing 100, the anti-rotation element 152 (i.e., the anti-rotation pin 170 and the anti-rotation hole 175) at the corner C2 adjacent to the reference positioning element 151, and the position regulation elements 153 (i.e., the position regulation pins 180 and the position regulation holes 185) at the corners C3 and C4 located at the opposite sides of the opening 21c.

In this example, the anti-rotation hole 175 of the anti-rotation element 152 may be a long hole extending in the direction (corresponding to the left-right direction in this example) of a line connecting the center of the reference positioning element 151 and the center of the anti-rotation pin 170, and the position regulation elements 153 also function as the reference positioning element 151 at the corner C3 and include the position regulation hole 185 as a long hole extending in the left-right direction and the position regulation pin 180 at the corner C4. In this modification, the span between the corners C3 and C4 located at the opposite sides of the opening 21c may also be regulated.

Third Modification

Figure 15A:
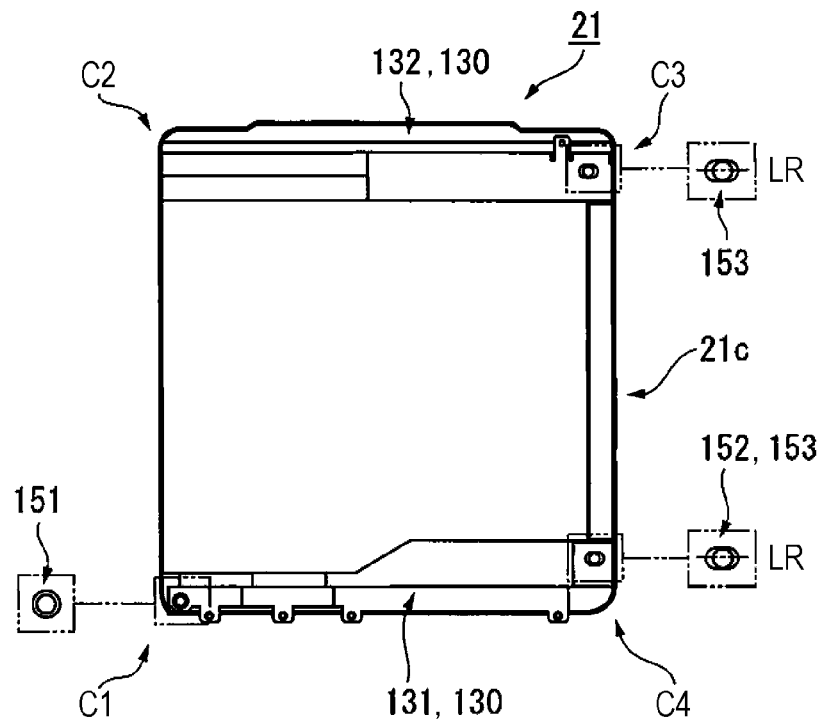
FIG. 15A illustrates a relevant part of a positioning mechanism according to a third modification.

FIG. 15A illustrates a positioning mechanism according to a third modification.

In FIG. 15A, the positioning mechanism 150 indicates another example where it has three positioning points instead of four positioning points.

In this example, for example, the positioning mechanism 150 is provided with the reference positioning element 151 (i.e., the positioning reference pin 160 and the reference hole 165) at a corner (i.e., C1 in this example) not facing the opening 21c of the device housing 21 among the four corners of the connection area between the lower housing 120 and the upper housing 100, the anti-rotation element 152 (i.e., the anti-rotation pin 170 and the anti-rotation hole 175) at the corner C4 adjacent to the reference positioning element 151, and the position regulation elements 153 (i.e., the position regulation pins 180 and the position regulation holes 185) at the corners C3 and C4 located at the opposite sides of the opening 21c.

In this example, the anti-rotation hole 175 of the anti-rotation element 152 may be a long hole extending in the direction (corresponding to the left-right direction in this example) of a line connecting the center of the reference positioning element 151 and the center of the anti-rotation pin 170, and one of the position regulation elements 153 also functions as the anti-rotation element 152 at the corner C4.

Fourth Modification

Figure 15B:
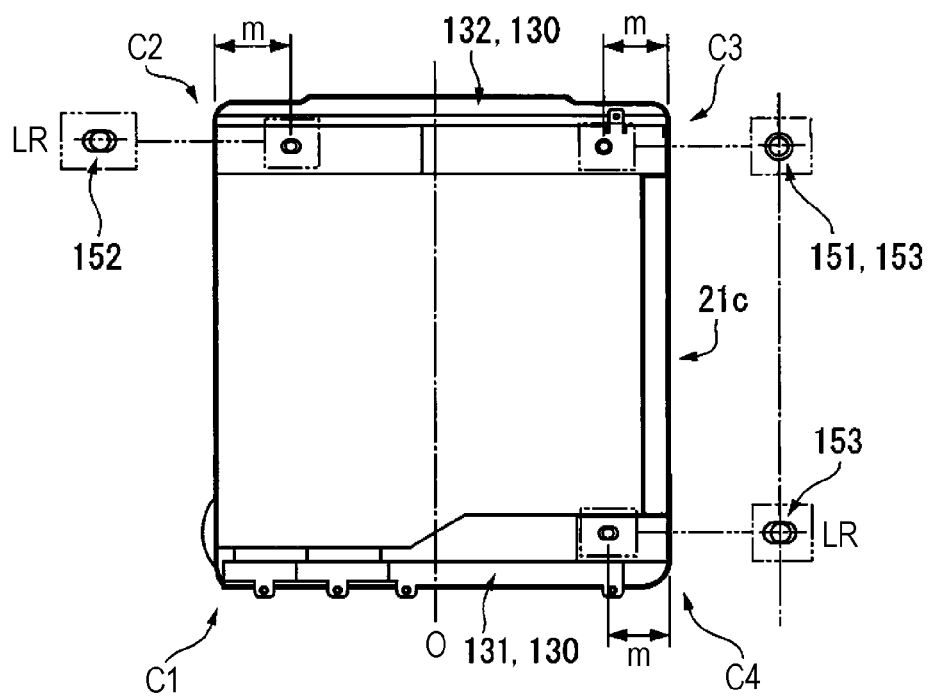
FIG. 15B illustrates a relevant part of a positioning mechanism according to a fourth modification.

FIG. 15B illustrates a positioning mechanism according to a fourth modification.

In FIG. 15B, the positioning mechanism 150 indicates another example where it has three positioning points instead of four positioning points.

In this example, for example, the positioning mechanism 150 is provided with the reference positioning element 151 (i.e., the positioning reference pin 160 and the reference hole 165) toward one of the corners (i.e., C3 in this example) facing the opening 21c of the device housing 21 among the four corners of the connection area between the lower housing 120 and the upper housing 100, the anti-rotation element 152 (i.e., the anti-rotation pin 170 and the anti-rotation hole 175) toward the corner C2 adjacent to the reference positioning element 151, and the position regulation elements 153 (i.e., the position regulation pins 180 and the position regulation holes 185) toward the corners C3 and C4 located at the opposite sides of the opening 21c.

In this example, the layout of the elements of the positioning mechanism 150 is similar to that in the second modification, but is different from the second medication (see FIG. 14B) in that the elements are provided toward the four corners instead of being provided at the four corners.

The expression "toward the corners" refers to a state where, when a center position O between neighboring corners C1 and C4 (or C2 and C3) and an end position of each corner are compared with each other, a distance m to the end of the corner is smaller than the distance to the center position O such that the corresponding element is offset toward the end.

In this example, it is confirmed that the positioning process is accurately performed by the positioning mechanism 150.

Fifth Modification

Figure 16A:
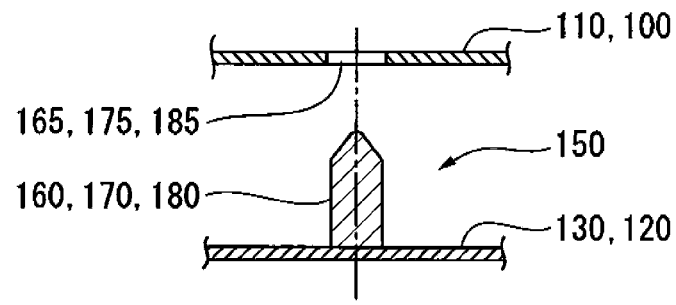
FIG. 16A schematically illustrates the layout of the elements of the positioning mechanism according to the first exemplary embodiment.
Figure 16B:
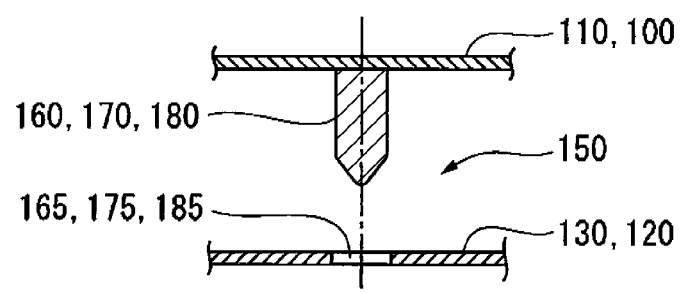
FIG. 16B illustrates the layout of elements of a positioning mechanism according to a fifth modification.

FIG. 16B illustrates a positioning mechanism according to a fifth modification.

In the positioning mechanism 150 according to each of the first and second exemplary embodiments, as shown in FIG. 16A, the upper connection frame 130 of the lower housing 120 is provided with the pins (i.e., the positioning reference pin 160, the anti-rotation pin 170, and the position regulation pins 180) of the elements 151 to 153 of the positioning mechanism 150, and the lower connection frame 110 of the upper housing 100 is provided with the holes (i.e., the reference hole 165, the anti-rotation hole 175, and the position regulation holes 185).

Alternatively, in the positioning mechanism 150 according to the fifth modification, the upper connection frame 130 of the lower housing 120 may be provided with the holes (i.e., the reference hole 165, the anti-rotation hole 175, and the position regulation holes 185) of the elements 151 to 153 of the positioning mechanism 150, and the lower connection frame 110 of the upper housing 100 may be provided with the pins (i.e., the positioning reference pin 160, the anti-rotation pin 170, and the position regulation pins 180).

Sixth Modification

Figure 16C:
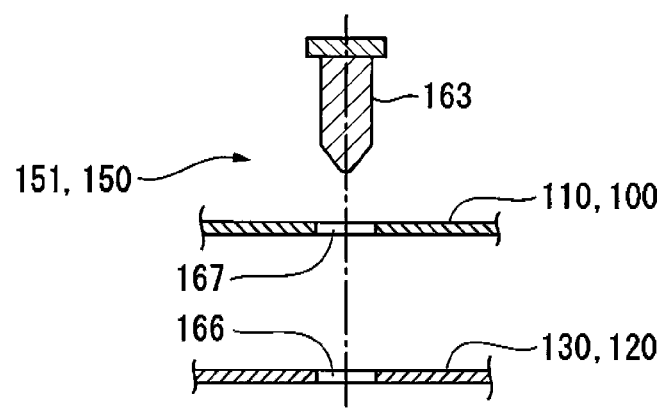
FIG. 16C illustrates a reference positioning element of a positioning mechanism according to a sixth modification.

FIG. 16C illustrates a positioning mechanism according to a sixth modification.

In the first exemplary embodiment, the reference positioning element 151 of the positioning mechanism 150 is provided with the positioning reference pin 160 at the upper connection frame 130 of the lower housing 120, and is provided with the reference hole 165 in the lower connection frame 110 of the upper housing 100.

Alternatively, the reference positioning element 151 of the positioning mechanism 150 according to the sixth modification may be provided with reference holes 166 and 167 in the upper connection frame 130 of the lower housing 120 and the lower connection frame 110 of the upper housing 100, respectively, and may have a positioning reference pin 163 fitted and maintained in these reference holes 166 and 167.

The reference position for positioning may be set by inserting the positioning reference pin 163 afterward in this manner.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:
1. A housing structure comprising:
an upper housing at an upper side of a device housing;
a lower housing at a lower side of the device housing; and
a positioner that positions the upper housing on the lower housing,
wherein one side surface of the device housing has an opening extending astride the lower housing and the upper housing when the upper housing is positioned on the lower housing, wherein the positioner includes:
a reference positioning element that is provided toward any one of four corners of a connection area between the lower housing and the upper housing and that has a reference hole provided in one of or each of the lower housing and the upper housing and a positioning reference pin fitted in the reference hole;
an anti-rotation element that is provided toward another corner of the four corners excluding the corner near where the reference positioning element is provided and that has an anti-rotation pin provided at one of the lower housing and the upper housing and an anti-rotation hole that is provided in the other one of the lower housing and the upper housing, receives the anti-rotation pin, and suppresses rotation of the upper housing relative to the lower housing about the reference positioning element; and
position regulation elements that are respectively provided toward corners, of the four corners, located at opposite sides of the opening such that the one side surface having the opening is interposed between the corners, the position regulation elements individually having position regulation pins provided at one of the lower housing and the upper housing and position regulation holes that are provided in the other one of the lower housing and the upper housing, receive the position regulation pins, and positionally regulate the corners located at the opposite sides of the opening.

2. The housing structure according to claim 1,
wherein the reference positioning element, the anti-rotation element, and the position regulation elements are entirely or partially provided at the four corners.

3. The housing structure according to claim 1,
wherein the reference positioning element, the anti-rotation element, and the position regulation elements are separately provided toward the four corners.

4. The housing structure according to claim 1,
wherein the position regulation elements partially function as the reference positioning element or the anti-rotation element.

5. The housing structure according to claim 1,
wherein the reference positioning element is provided toward a corner, of the four corners, not adjacent to the one side surface having the opening.

6. The housing structure according to claim 5,
wherein the anti-rotation element is provided toward a corner, of the four corners, not adjacent to the one side surface having the opening.

7. The housing structure according to claim 1, further comprising:
a guide that guides the upper housing relative to the lower housing when the upper housing is being positioned on the lower housing such that each element of the positioner is brought into a contact state.

8. The housing structure according to claim 7,
wherein the guide is provided at each of the corners near where the elements of the positioner are provided.

9. The housing structure according to claim 7,
wherein the guide comes into contact with an opposing housing frame member before each element of the positioner is brought into the contact state.

10. The housing structure according to claim 1, further comprising:
a securing unit that secures frame members of the lower housing and the upper housing to each other, the securing unit having a securing point, in the frame members, toward each element of the positioner.

11. The housing structure according to claim 10,
wherein the securing unit fastens the frame members to each other with an anti-lift bracket interposed therebetween.

12. The housing structure according to claim 1,
wherein a retrofittable reinforcement unit is bridged across the opening after the upper housing is positioned on the lower housing.

13. The housing structure according to claim 1,
wherein connection sections of the lower housing and the upper housing facing the opening are connected such that the lower housing conforms to a shape of the upper housing.

14. A processing device comprising:
the housing structure according to claim 1;
an upper processing unit that is installed in the upper housing of the device housing; and
a lower processing unit that is installed in the lower housing of the device housing.

15. The processing device according to claim 14,
wherein the upper processing unit is an imaging unit that forms an image onto a medium,
wherein the lower processing unit is a medium feeding unit that feeds the medium to the imaging unit, and
wherein the reference positioning element and the anti-rotation element of the positioner are disposed at a side provided with a medium transport path extending from the medium feeding unit to the imaging unit.

16. The processing device according to claim 15,
wherein the medium transport path is provided along a surface different from the one side surface having the opening.

17. A housing structure comprising:
an upper housing at an upper side of a device housing;
a lower housing at a lower side of the device housing; and
a positioner that positions the upper housing on the lower housing,
wherein one side surface of the device housing has an opening extending astride the lower housing and the upper housing when the upper housing is positioned on the lower housing,
wherein the positioner includes:
a reference positioning element that is provided toward any one of four corners of a connection area between the lower housing and the upper housing and that has a reference hole provided in one of or each of the lower housing and the upper housing and a positioning reference pin fitted in the reference hole;
an anti-rotation element that is provided toward another corner of the four corners excluding the corner near where the reference positioning element is provided and that has an anti-rotation pin provided at one of the lower housing and the upper housing and an anti-rotation hole that is provided in the other one of the lower housing and the upper housing, receives the anti-rotation pin, and has a shape of a long hole extending in a direction connecting a center of the reference positioning element and a center of the anti-rotation pin; and
position regulation elements that are respectively provided toward corners, of the four corners, located at opposite sides of the opening such that the one side surface having the opening is interposed between the corners, the position regulation elements individually having position regulation pins provided at one of the lower housing and the upper housing and position regulation holes that are provided in the other one of the lower housing and the upper housing and that receive the position regulation pins, wherein at least one of the position regulation holes has a shape of a long hole extending orthogonally to a direction connecting centers of the position regulation pins.

18. The housing structure according to claim 17, wherein the reference positioning element, the anti-rotation element, and the position regulation elements are entirely or partially provided at the four corners.

19. The housing structure according to claim 17, wherein the reference positioning element, the anti-rotation element, and the position regulation elements are separately provided toward the four corners.

20. The housing structure according to claim 17, wherein the position regulation holes of the position regulation elements are both long holes.

\* \* \* \* \*